US011450095B2

(12) United States Patent
Anderton-Yang

(10) Patent No.: US 11,450,095 B2
(45) Date of Patent: Sep. 20, 2022

(54) MACHINE LEARNING FOR VIDEO ANALYSIS AND FEEDBACK

(71) Applicant: Voomer, Inc., Brookline, MA (US)

(72) Inventor: David Wesley Anderton-Yang, Brookline, MA (US)

(73) Assignee: Voomer, Inc., Brookline, MA (US)

( * ) Notice: Subject to any disclaimer, the term of this patent is extended or adjusted under 35 U.S.C. 154(b) by 0 days.

(21) Appl. No.: 17/581,598

(22) Filed: Jan. 21, 2022

(65) Prior Publication Data

US 2022/0237892 A1 Jul. 28, 2022

Related U.S. Application Data

(60) Provisional application No. 63/140,259, filed on Jan. 22, 2021.

(51) Int. Cl.
*G06V 10/764* (2022.01)
*G06V 10/44* (2022.01)
*G06V 10/82* (2022.01)

(52) U.S. Cl.
CPC .......... *G06V 10/764* (2022.01); *G06V 10/454* (2022.01); *G06V 10/82* (2022.01)

(58) Field of Classification Search
CPC ..... G06V 10/764; G06V 10/454; G06V 10/82
See application file for complete search history.

(56) References Cited

U.S. PATENT DOCUMENTS

| | | | |
|---|---|---|---|
| 8,620,909 B1 | 12/2013 | Rennison | |
| 8,856,000 B1 | 10/2014 | Larsen et al. | |
| 10,623,775 B1 * | 4/2020 | Theis | G06N 3/0454 |
| 11,144,882 B1 | 10/2021 | Olshansky | |
| 11,216,784 B2 * | 1/2022 | Preuss | A61B 5/164 |
| 2004/0093263 A1 | 5/2004 | Doraisamy et al. | |
| 2005/0283378 A1 | 12/2005 | Iserson | |
| 2007/0088601 A1 | 4/2007 | Money et al. | |

(Continued)

FOREIGN PATENT DOCUMENTS

WO WO 2015/198317 12/2015

OTHER PUBLICATIONS

Hoque, Mohammed, et al. "Mach: My automated conversation coach." Proceedings of the 2013 ACM international joint conference on Pervasive and ubiquitous computing. 2013. (Year: 2013).*

(Continued)

*Primary Examiner* — Utpal D Shah
(74) *Attorney, Agent, or Firm* — Fish & Richardson P.C.

(57) ABSTRACT

Methods, systems, and apparatus, including computer programs encoded on a computer storage medium, for machine learning for video analysis and feedback. In some implementations, a machine learning model is trained to classify videos into performance level classifications based on characteristics of image data and audio data in the videos. Video data captured by a device of a user following a prompt that the device provides to the user is received. A set of feature values that describe audio and video characteristics of the video data are determined. The set of feature values are provided as input to the trained machine learning model to generate output that classifies the video data with respect to the performance level classifications. A user interface of the device is updated based on the performance level classification for the video data.

20 Claims, 5 Drawing Sheets

(56) References Cited

U.S. PATENT DOCUMENTS

| | | | |
|---|---|---|---|
| 2008/0086504 A1 | 4/2008 | Sanders et al. | |
| 2008/0162569 A1 | 7/2008 | Schifone | |
| 2008/0172284 A1 | 7/2008 | Hartmann | |
| 2008/0270467 A1 | 10/2008 | Clarke | |
| 2009/0228323 A1 | 9/2009 | Ebrahimian | |
| 2010/0241581 A1 | 9/2010 | Duraiswamy et al. | |
| 2011/0088081 A1 | 4/2011 | Folkesson et al. | |
| 2012/0271774 A1 | 10/2012 | Clegg | |
| 2013/0097093 A1 | 4/2013 | Kolber et al. | |
| 2013/0111401 A1 | 5/2013 | Newman et al. | |
| 2013/0185218 A1 | 7/2013 | Hermsdorff et al. | |
| 2013/0226578 A1* | 8/2013 | Bolton | H04N 21/262 704/235 |
| 2013/0254129 A1 | 9/2013 | Perlmutter et al. | |
| 2014/0236850 A1 | 8/2014 | Holland | |
| 2015/0206103 A1* | 7/2015 | Larsen | G06N 20/00 705/321 |
| 2016/0034851 A1* | 2/2016 | Xiao | G06Q 10/1053 348/14.02 |
| 2016/0042477 A1 | 2/2016 | Gardner et al. | |
| 2016/0379170 A1 | 12/2016 | Pande | |
| 2017/0154314 A1 | 6/2017 | Mones et al. | |
| 2017/0213190 A1* | 7/2017 | Hazan | G10L 15/1815 |
| 2017/0293858 A1 | 10/2017 | Larsen et al. | |
| 2018/0025303 A1 | 1/2018 | Janz | |
| 2018/0192125 A1* | 7/2018 | Bolton | H04N 7/141 |
| 2018/0232751 A1 | 8/2018 | Terhark et al. | |
| 2019/0034881 A1* | 1/2019 | Taylor | G06F 16/285 |
| 2019/0057356 A1* | 2/2019 | Larsen | G06K 9/6271 |
| 2019/0272504 A1 | 9/2019 | Pande | |
| 2019/0392397 A1* | 12/2019 | Taylor | G06Q 10/1053 |
| 2020/0035234 A1 | 1/2020 | Aarabi | |
| 2020/0065612 A1 | 2/2020 | Xu et al. | |
| 2020/0143329 A1 | 5/2020 | Gamaliel | |
| 2020/0193387 A1 | 6/2020 | Jarrett et al. | |
| 2020/0311682 A1* | 10/2020 | Olshansky | G10L 15/26 |
| 2021/0012239 A1* | 1/2021 | Arzani | G06N 20/00 |
| 2021/0065131 A1 | 3/2021 | Bixler et al. | |
| 2021/0233030 A1* | 7/2021 | Preuss | G09B 7/00 |
| 2021/0233031 A1 | 7/2021 | Preuss et al. | |
| 2021/0294811 A1 | 9/2021 | Buhrmann et al. | |
| 2021/0350329 A1 | 11/2021 | Sahashi | |

OTHER PUBLICATIONS

Naim, Iftekhar, et al. "Automated analysis and prediction of job interview performance." IEEE Transactions on Affective Computing 9.2 (2016): 191-204. (Year: 2016).* developers.google.com [online], "Loss functions," Feb. 10, 2020, retrieved on Feb. 23, 2022, retrieved from URL<https://developers.google.com/machine-learning/gan/loss>, 4 pages.

towardsdatascience.com [online], "Generative adversarial networks GANs: A beginner's guide," Jul. 18, 2020, retrieved on Feb. 23, 2022, retrieved from URL<https://towardsdatascience.com/generative-adversarial-networks-gans-a-beginners-guide-f37c913b7817>, 16 pages.

International Search Report and Written Opinion in International Appln. No. PCT/US2022/013347, dated May 13, 2022, 18 pages.

Nguyen et al., "Multimodal analysis of body communication cues in employment interviews," Proceedings of the 15th ACM on International conference on multimodal interaction, Dec. 2013, pp. 437-444.

* cited by examiner

MACHINE LEARNING FOR VIDEO ANALYSIS AND FEEDBACK

CROSS-REFERENCE TO RELATED APPLICATION

This application claims the benefit of U.S. Provisional Patent Application No. 63/140,259, filed on Jan. 22, 2021, the entirety of which is incorporated by reference herein.

TECHNICAL FIELD

This disclosure generally relates to video analysis and machine learning models.

BACKGROUND

Video recording is becoming commonplace in many different fields and industries, including security monitoring, videoconferencing, industrial processes, and more. The number of consumer devices capable of recording video continues to increase, which has allowed video capture to be used regularly at home and in the office. Given the large volume of video data generated, however, it is often impractical for a human to review much of the video that is captured. As a result, automated systems have been created to evaluate videos, such as to assign classifications or scores for various characteristics of the videos. For example, some automated systems attempt to evaluate videos submitted by job applicants, to assign scores used to filter the candidate pool. However, automated systems for video analysis can be limited or biased. In addition, the way that machine learning and artificial intelligence systems operate is often opaque and users may not be able to determine which factors led to the results produced. In many cases, users may not even understand which aspects of a video were assessed by a model or automated system.

SUMMARY

This specification describes technologies for training and using machine learning models to evaluate video data. In some implementations, a computer system provides a platform for users to record videos as well as assign ratings for the videos. The system uses these inputs as training data to train machine learning models to classify videos into different performance level classifications. Through training, the machine learning models learn the combinations of video characteristics that are most likely to result in high ratings or other desired outcomes. In addition to training models to make accurate classifications, the system can also use the learning of the model to provide feedback that influences generation of future videos. For example, in addition to providing classifications or scores for videos, the system can provide output indicating the characteristics of the videos that influenced the classification results. In addition, the system can provide output indicating changes to video characteristics that would adjust the scores or classifications provided. As a result, the system can use the machine learning models to both classify videos as well as provide feedback for video generation.

The system can trained to predict classifications that would be predicted by other third-party artificial intelligence systems. It can be very useful to predict or estimate how a third-party system would classify a video, both to provide predictability about the classifications to expect as well as to learn how to generate videos that achieve a desired classification. However, this type of prediction can be very difficult, especially when access to the third-party system is not available and examples of the third-party system's behavior (e.g., input videos and corresponding system outputs) are also unavailable. Nevertheless, the present system can use various techniques to learn how third-party systems classify videos and to approximate the functionality of those third-party systems.

For example, the present system can train its own models in a manner that aligns results with those likely to be achieved with a third-party video analysis system (e.g., a "black box" system). The system can learn, in effect, how different audio characteristics and image characteristics in video data influence various outcomes in the third-party system. Even without access to the third-party system or its outputs, the present system can learn to provide classification results that approximate or estimate the results that other systems would provide. One way this can be done is to use sets of training data that, while different from the data input and processed by the third-party systems, are generated in a similar manner and with similar characteristics (e.g., under similar conditions and with similar content). In addition, classification labels for these sets of training data can be assigned based on various sources of proxy outputs that are correlated with or based in part on outcomes influenced by the third-party system. Thus, even without access to the third-party system and without outputs of the third-party system for examination, the present system can infer the likely results that the third-party system would have been achieved for similar videos, and use those relationships to train a model to approximate the results of the third-party system.

The system can use a generative adversarial network (GAN) framework for training its models. In a GAN, a discriminator is trained to classify data into various classifications or categories as accurately as possible, while a generator is trained to generate data that will be assigned to a desired classification. For example, in the context of object recognition using image data, a discriminator may learn to distinguish real photographs of a particular type of object, while the generator learns to generate artificial images that are sufficiently realistic for the discriminator to classify them as real photographs of the object. The discriminator and generator learn together, with the discriminator becoming increasingly accurate at distinguishing images of a real object from artificially generated images, and the generator becoming increasingly accurate at generating realistic-appearing images in an attempt to convince the discriminator that they are authentic. The GAN framework has discriminator loss calculations that improve the accuracy of the discriminator, as well as generator loss calculations to improve the accuracy of the generator.

In the present system, the primary machine learning model can act as a discriminator, iteratively learning to classify videos according to a set of classifications with increasing accuracy. Rather than using a generator model to produce videos to be tested, however, users of the system can act as generators that contribute videos to be tested. The GAN structure still produces discriminator loss values for improving the discriminator model, and the generator loss values can be used to provide feedback to the users of the system. This feedback guides users to improve the quality of future videos they record, so the users can produce videos that better meet the discriminator's criteria for videos classified as high-quality or likely to result in a desired outcome. When the training of the discriminator is aligned with or calibrated to the analysis of one or more third-party systems, the generator loss feedback to users effectively teaches users how to produce videos that better achieve desired results in the analysis by the third-party systems.

As an example, the techniques of the present application can be applied in the area of analyzing and providing feedback for video interviews of job applicants. It is increasingly common for employers to ask job applicants to submit a video interview recording, such as a short video-recorded answer to a question. Employers or contractors then use the videos to screen job applicants. Review of the videos is outsourced and the videos are evaluated by an automated software program or machine learning system. The automated systems typically use proprietary, non-public criteria in an attempt to identify high-quality videos and to reject or classify other videos as lower quality. While automated classification provides efficiency to employers, job applicants are often at a disadvantage because they do not receive the scores for their videos, cannot predict how their videos will be received, and generally do not even know the criteria used to judge their videos.

The techniques of the present application can provide machine learning and artificial intelligence tools that assist job applicants, giving job applicants tools that can predict how their videos would likely score in the job-screening process and can give feedback so they can score better in the automated platforms. For example, the present system can provide a machine-learning network to help job applicants generate videos that will successfully pass screening done using the machine learning networks in other third-party job applicant screening systems. The third-party systems used for job screening are typically inaccessible (both to job applicants and the present system) and the evaluation criteria the third-party systems use is often secret and unknown. However, the present system can use the GAN framework to train a discriminator model to act similarly to third-party video interview analysis systems, with the discriminator model itself learning to evaluate various video and audio factors to predict a desired outcome (e.g., a video being classified sufficiently to pass video interview screening). With this discriminator model trained and available as a stand-in for the third-party system, the generator loss in the GAN framework can be used to provide feedback to job applicants on practice videos they create. The system can inform users of the expected results that a practice video would receive (e.g., a likelihood or classification of whether it would pass automated screening), the factors that influence the classification of the practice video, and recommended changes or targets to improve the classification or likelihood of success for future videos.

The present system addresses many of the technical challenges that arise in generating video analysis systems. Many systems need to align output of a model with the results from an inaccessible third-party system. The present system can calibrate its output with respect to third-party systems with multiple levels of feedback. For example, user-reported feedback can provide ratings that users provide for their own videos. This provides a high volume of example video data for training and basic classification labels showing how different videos can be ranked or classified relative to each other. The system can then use instances of objective outcomes, such as actions taken following video interview submissions to the third-party systems, to calibrate or correlate the self-reported ratings with objective results. For example, different people may be have differences in the personal judgments and rating scales that they apply. One person may rate his practice videos at four out of five, and another may rate his practice videos of similar quality and content at two out of five. When these users create and submit videos through a third-party system, the users can report additional information such as ratings they would give to their submitted video as well as results achieved (e.g., whether they passed the screening and continued with the interview process, whether they were hired, etc.). Even without access to the submitted videos and without access to the outputs of the third-party system, the present system can use the additional information to calibrate its output and align it with the third-party system.

As an example, a first user may rate recent practice videos as three out of five, and then indicate that a different video submitted to a third-party analysis platform would also receive the same score. If the submitted video led to a desired result (e.g., further consideration, a job offer, etc.), the system can label the first user's practice videos scored at three and above as likely to lead to a successful outcome. As another example, a second user may rate their recent practice videos as four out of five, and then indicate that a different video submitted to a third-party analysis platform would also receive the same score. However, if the submitted video led to an unfavorable result (e.g., a rejection or failure to be considered further), the system can label the second user's videos scored four and lower as being are likely to fail to achieve the desired outcomes. In this manner, the system can use self-reported ratings from users to generate strong training data sets, even though the users' personal rating scales may weight different characteristics differently. The system can further improve accuracy by obtaining other information about the users, such as job qualifications and job history (e.g., from a resume, curriculum vitae, social media web page, etc.), and using this data to control for other factors that may affect the outcomes that users report. For example, across the set of users that report outcomes for a company or position, the system can control for job qualifications in, to avoid labelling videos as being of poor quality when in fact the user's qualifications other than the video interview were likely to have had a larger influence on a negative outcome.

In some implementations, the system enables users to provide detailed or fine-grained self-assessment feedback, beyond an overall rating or classification for a video. For example, the system may enable a user to provide a rating or score for each of multiple aspects or characteristics of a video. For example, a different rating can be provided for visual aspects (e.g., the appearance of the user, the visual background for the video, lighting, etc.), for verbal aspects (e.g., content of speech, such as sentence structure, word choice, quality of the response to the prompt, etc.), and for vocal aspects (e.g., speech sound characteristics, such as clarity of speech, prosody, speaking speed, tone, pitch, inflection, etc.). In some cases, a user may select an emoji or overall score about how well person performed in the practice interview. The user can also give a score for each of the three dimensions of visual, vocal, and verbal performance. The system can use these ratings to weight the training data to more accurately train the model. For example, a person might be practicing in an area with poor visual characteristics (e.g., cluttered desk or in the kitchen), and so may rate the visual performance as poor. The system can use that feedback to assign a lower weight to the visual aspects of that video, so that the system either uses the video as an example of a poor visual background or else gives low importance to the visual characteristics since it is not representative of an actual interview setting.

The system also increases accuracy of modeling by accounting for the context associated with videos, both for training and for inference processing. The standards and criteria used to evaluate a video can vary significantly from one context to the next. For example, different criteria and different thresholds may be used for screening job applicants for different employers, roles, and industries. In addition, characteristics that form a good answer to one question may not be the same as the characteristics of a good answer to another question. Other factors can also vary in their interpretation from one context to another. For example, visual characteristics that may lead to high performance in one context (e.g., bright colors when interviewing for a graphic design position) may be different from those that provide high performance in a different context (e.g., conservative colors for an interview for a corporate accounting position). Similarly, the values for speaking speed, word choice, and many other characteristics can vary based on context, and all aspects of the video (e.g., all feature values provided as input to the model) contribute to the results. The system can account for the context of a video (e.g., employer, role, industry, question asked, interview platform used, etc.) by using multiple models tailored or tuned for different contexts. For example, different models can be generated for different employers, for different types of questions, for different third-party platforms, or for different combinations of contextual factors. The various models can each be trained with training data produced in or associated with the corresponding context(s) for the model. For example, a model for evaluating video interviews for applicants to a particular company can be trained with example videos that are created as practice for the particular company or which use questions indicated to be the same or similar as those used for the particular company. The model can also be trained using at least some videos labeled determined based on outcomes for that particular company (e.g., actual results from the hiring decisions of the particular company).

In one general aspect, a computer-implemented method includes: training a machine learning model to classify videos into performance level classifications based on characteristics of image data and audio data in the videos, wherein the model is trained based on training data that includes (i) videos recorded in response to prompts to users, wherein the videos that include speech of the users and image data of the users, and (ii) classification labels assigned to the videos; receiving, over a communication network, video data captured by a device of a user following a prompt that the device provides to the user, wherein the video data depicts a face of the user and includes speech of the user that responds to the prompt provided by the device; determining, based on the video data, a set of feature values that describe audio and video characteristics of the video data; providing the set of feature values as input to the trained machine learning model to generate output that classifies the video data with respect to the performance level classifications based on the set of features provided to the trained machine learning model; and updating a user interface of the device based on the performance level classification for the video data, including transmitting to the device over the communication network user interface data that indicates the performance level classification and one or more characteristics of the video data that contributed to the classification of the video data.

Implementations may include one or more of the following features, in any combination or sub-combination.

In some implementations, the machine learning model is a neural network; and training the machine learning model comprises updating values of weights for nodes of the neural network to improve classification accuracy of the machine learning model.

In some implementations, the output of the trained machine learning model comprises a value, for each of the performance level classifications, indicating a likelihood that the corresponding performance level classification is applicable to the input set of feature values.

In some implementations, the output of the trained machine learning model comprises scores for each of multiple performance level classifications, the scores providing a probability distribution over the multiple performance level classifications. The method includes: identifying, from among the scores, a score indicating the highest probability; and classifying the received video data with the performance level classification that corresponds to the identified score indicating the highest probability.

In some implementations, the neural network is a convolutional neural network or a deep learning neural network.

In some implementations, the performance level classifications represent different levels of quality of video data.

In some implementations, the performance level classifications include at least three classifications that represent different levels of quality.

In some implementations, the method includes: obtaining practice videos respectively recorded by different users; and obtaining information indicating outcomes that are based at least in part on analysis of submitted videos by one or more third-party video analysis systems. The classification labels in the training data are assigned based on the outcomes that are based at least in part on the analysis by one or more third-party video analysis systems.

In some implementations, the classification labels are based at least in part on self-reported scores for the practice videos that are provided by the users that recorded the practice videos.

In some implementations, the method includes: for each of the different users, assigning classification labels for the practice videos of the user in a manner that aligns the classification labels with an objective standard using an outcome resulting from a submitted video for the user submitted to a third-party video analysis system, including: determining a score that the user indicates represents a level of quality of the submitted video that resulted in a particular outcome; identifying, from within the set of practice videos of the user, other videos that the user rated as having at least the identified score; and assigning, to the identified videos having at least the determined score, classification labels for a particular performance level classification that corresponds to the particular outcome.

In some implementations, the method includes calibrating the multiple sets of scores for the different users based on determined correlations between the self-reported scores in the multiple sets of scores and the outcomes, wherein the outcomes indicate the occurrence or non-occurrence of events for the practice interview videos; and generating the classification labels assigned to the videos using the calibrated sets of scores.

In some implementations, the performance level classifications represent different ranges of likelihoods of success in an interview for a particular company or for a particular role.

In some implementations, the performance level classifications are a predetermined set of classifications, and the method includes using the output to identify a classification from the predetermined set of classifications.

In some implementations, receiving, from the device, an indication of a particular company that the user is interested in interviewing with or a particular role that the user interested in interviewing for; and selecting the machine learning model from among multiple machine learning models each trained based on example video data associated with different companies or roles.

In some implementations, selecting the machine learning model from the multiple machine learning models comprises selecting a machine learning model that is trained using video data that: includes responses to prompts selected for the particular company or the particular role; meets criteria for the particular company or the particular role; or is evaluated using criteria for the particular company or the particular role.

In some implementations, the method is performed by a computer system providing a platform for recording and analysis of video data, wherein training the machine learning model comprises training the machine learning model in multiple phases using different types of training data, including using multiple sources of training data from among a set consisting of: scores or classifications provided for the videos by the users depicted in the videos; scores or classifications provided by users different from the users depicted in the videos; groups of videos recorded by different users; progressions of scores or classifications for videos individual users across multiple videos; and outcomes that result from other videos that are not available to and are not recorded using the platform provided by the computer system, the outcomes being for users for which at least one video is available to or recorded using the platform.

In some implementations, the video data is recorded through a platform provided by one or more computers, and wherein updating the user interface comprises providing, for display in the user interface, data that indicates a ranking or classification of the video data relative to videos of a set of other users that have recorded videos using the platform.

In some implementations, the method includes: segmenting the video data into multiple segments each having no more than a predetermined maximum length; wherein determining the set of feature values comprises determining a set of feature values for each of the multiple segments of the video data, the set of feature values for each segment indicating audio and video characteristics of the video data in the segment. Providing the set of feature values comprises providing, as input to the trained machine learning model, the set of feature values for each of the multiple segments to obtain separate output of the trained machine learning model for each of the multiple segments. The method comprises combining the separate outputs of the trained machine learning model for the multiple segments such that the performance level classification for the video data is a composite of information from the separate outputs for the multiple segments.

In some implementations, training the machine learning model comprises training the machine learning model to provide output that approximates classification results made using output of a third-party machine learning system; and updating the user interface comprises providing feedback to indicate changes to characteristics of the video data, wherein the changes are predicted by the one or more computers to increase a likelihood that a predetermined outcome would be achieved in response to providing based on the third-party machine learning system.

In some implementations, the method includes: after receiving the video data, and before updating the user interface based on the performance level classification, causing the user interface to provide one or more interactive controls for the user to enter a rating for the video data; receiving, over the communication network, data indicating a rating the user entered using the one or more interactive controls; and using the video data and the rating entered by the user to further train the machine learning model.

In some implementations, the one or more interactive controls are configured to receive one or more of an overall score or classification for the video data, a score or classification for verbal characteristics represented in the video data, a score or classification for vocal characteristics represented in the video data, or a score or classification for visual characteristics represented in the video data.

In some implementations, the method includes: storing a profile for a first user, first videos recorded by the first user, a context for the first videos, and ratings that the first user provided for each of the first videos; receiving data indicating an outcome for the first user that occurred after submission of a second video from the first user to a third-party analysis system, wherein the second video submitted to the third-party analysis system is different from the first videos and is not available for use in training the machine learning model; correlating the outcome for the first user with at least a particular first video of the first videos recorded by the first user; and based on the correlation, generating training labels for one or more of the first videos in a manner that uses the outcome and the rating of the first video for the particular first video to calibrate ratings of the first user to an objective reference provided by the outcome.

In some implementations, receiving data indicating the outcome comprises at least one of (i) receiving a rating that the first user provided for the second video that is not available for use in training (ii) obtaining, from a third-party server system, user profile data for the first user or status data for the first user.

In some implementations, the method includes: storing metadata that indicates, for each of a set of previously recorded videos, (i) a performance level classification or score assigned for the video based on output of the trained machine learning model and (ii) a set of feature values for the video; grouping the previously recorded videos into different groups based on the assigned performance level classifications or scores; and based on the sets of feature values for the videos in the respective groups, identifying values, ranges, or combinations of feature values predicted to cause a video to be classified in a performance level classification for a highest level of performance or quality.

In some implementations, grouping the previously recorded videos comprises clustering the previously recorded videos according to the assigned performance level classifications or scores; and identifying the values, ranges, or combinations of feature values comprises identifying values, ranges, or combinations of feature values in common among the sets of input feature values for the videos in a cluster for the highest level of performance or quality.

In some implementations, the method includes performing regression analysis to determine relationships between values of the set of feature values and assigned performance level classifications or scores.

In some implementations, the method includes using the identified values, ranges, or combinations of feature values to set a target zone for one or more types of audio or video characteristics, the target zone representing a range or set of feature values most likely to lead to classification in the highest level of performance or quality. Updating the user interface includes providing, for presentation, data indicating (i) the target zone for a particular type of audio or video characteristic and (ii) an indication of a measure of the video data for the particular type of audio or video characteristic in relation to the target zone.

In some implementations, determining the groups comprise determining (i) a first group of videos classified in the highest level of performance or quality, and (ii) a second group of videos classified in a lowest level of performance or quality. Identifying the values, ranges, or combinations of feature values comprises identifying, for one or more types of audio or video characteristics, a range or set of feature values that included for a majority of the videos in the first group and that are not included for a majority of the videos in the second group.

In some implementations, the method includes providing user interface data for a simulation user interface having interactive user interface controls that enable a user to specify different values for audio and video characteristics, wherein the simulation user interface is configured to present a simulation result indicating a performance level classification determined based on the values specified using the user interface controls.

In some implementations, the method includes: receiving, through the interactive user interface controls, user input that sets one or more values for audio and video characteristics; determining a second set of feature values based on the values set by the user input; generating second output of the trained machine learning model based on the second set of features provided to the trained machine learning model; and providing, for presentation in the simulation user interface, a performance level classification, selected based on the second output of the trained machine learning model, that indicates a performance level classification that would be achieved by a video having the one or more values for audio and video characteristics as indicated by the user input.

In some implementations, the method includes: providing, for presentation in the simulation user interface, values indicating audio and video characteristics of a video recorded by the user; and receiving, through the simulation user interface, user input that alters one or more of the values to specify a change with respect to at least one audio or video characteristic of the video; and in response to receiving the user input, providing, for display in the simulation user interface, a change in performance level classification that would result from the change with respect to the at least one audio or video characteristic of the video.

In some implementations, the method includes storing multiple trained machine learning models, each of the trained machine learning models being trained to classify videos for a different context; identifying a context for the video data; and selecting, from among multiple trained machine learning models, a trained machine learning model for the identified context. Providing the set of feature values as input to the trained machine learning model comprises providing the set of feature values as input to the selected machine learning model for the identified context.

In some implementations, the method includes storing, for each of multiple videos, metadata that indicates a context for which the video was recorded; determining different subsets of the multiple videos based on the metadata, wherein each of the subsets corresponds to a different context; and training a machine learning model for each of the different contexts, wherein each of the machine learning models is trained using the subset of videos corresponding to the context for which the machine learning model is trained.

In some implementations, the different contexts represent at least one of: different prompts responded to in the videos; different companies, industries, roles, or positions that the videos for which the videos were recorded; different target outcomes or purposes for which the videos were created; or different information presented on a user interface immediately before or during recording of the videos.

Other embodiments of these and other aspects discussed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
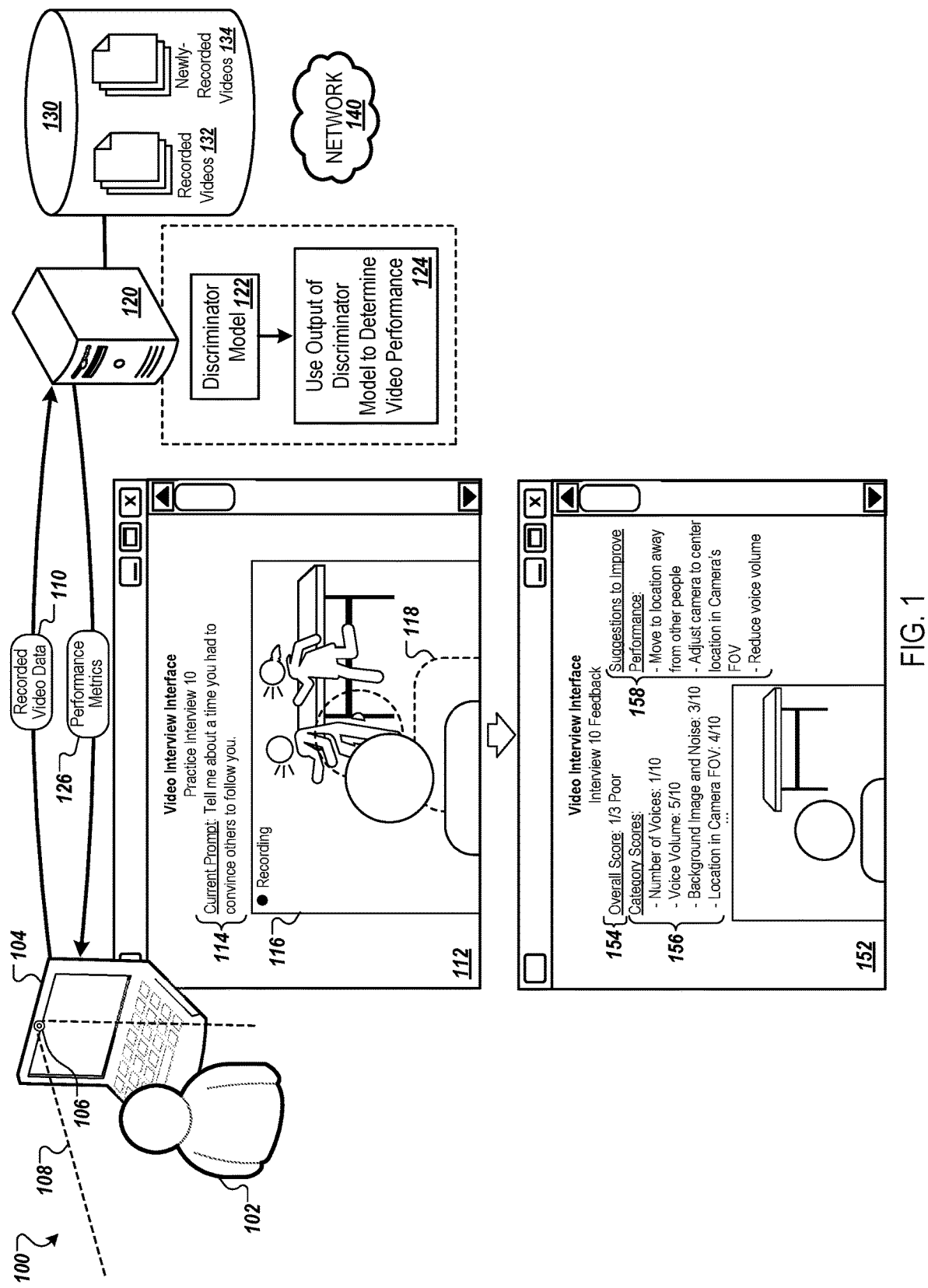
FIG. 1 is a diagram that illustrates an example system for evaluating video characteristics with a machine learning model and providing evaluation results through a computing device.

In some implementations, a computer system trains and uses machine learning models to evaluate video data. The computer system can provide a platform for users to record videos as well as assign ratings for the videos. The system uses these inputs as training data to train machine learning models to classify videos into different performance level classifications. Through training, the machine learning models learn the combinations of video characteristics that are most likely to result in high ratings or other desired outcomes. In addition to training models to make accurate classifications, the system can also use the learning of the model to provide feedback that influences generation of future videos. For example, in addition to providing classifications or scores for videos, the system can provide output indicating the characteristics of the videos that influenced the classification results. In addition, the system can provide output indicating changes to video characteristics that would adjust the scores or classifications provided. As a result, the system can use the machine learning models to both classify videos as well as provide feedback for video generation.

The interview process for evaluating job applicants is becoming increasingly automated and outsourced due to a number of factors, including increasing time constraints of interviewers, number of applicants, and number of open positions. As a result, employers are increasingly relying on automatically generated performance results for applicants in determining their suitability for a position rather than forming their own impressions in a traditional interview format. Due to constraints introduced by automated analyses, these newer interview formats typically include rigid requirements, such as limited question preparation times and response times, often without options for applicants to correct or update their responses. Many applicants find themselves struggling to get accustomed to these newer interview formats and to accurately evaluate their own performance in interviews that use these newer interview formats.

The machine learning model can be or include a discriminator model that is trained to classify recorded videos of users into different performance level classifications. The performance level classifications can indicate, for example, different quality levels for the recorded videos, whether the recorded videos have sufficient or insufficient quality, different probability ranges of the users succeeding in actual interviews (e.g., getting hired, getting a second interview, etc.), or whether the users are more likely or less probable to succeed in actual interviews. A system that includes the machine learning model can initiate a practice interview session in response to receiving a request from a user or an indication that a user has opened a practice interview application. The system can then provide a practice interview interface that allows the user to make a new video recording that include their responses to a number of prompts for the interview. These prompts may be preselected or randomly selected from one or more pools of available prompts, such as a pool of available prompts that are specific to a particular company or particular role and a pool of generic prompts that are frequently provided to interviewees across multiple companies and roles.

The machine learning model can classify user recorded videos into the different performance level classifications using values for a number of different video and audio characteristics extracted from the recorded videos. These characteristics can include, for example, a percentage of time that the user maintained eye contact during the practice interview, the number of times the user' paused their speech during the practice interview, the number of unique voices detected during the practice interview, the number of objects detected in the user's background during the practice interview, keywords detected from the user's speech during the practice interview, volume levels of the user's speech during the practice interview, a number of monotone sections of the user's speech during the practice interview, etc.

The training data for the machine learning model can include multiple sets of visual and audio characteristics extracted from sample video recordings and generated labels for those sample video recordings. The sample video recordings can include previously recorded videos of users by the system. The labels can be user generated. For example, users can generate the labels as feedback for their own videos that they are represented in. Alternatively, the system can provide the previously recorded videos to a set of reviewers who then generate labels for the previously recorded videos. The system can determine losses between the labels and the output of the machine learning models (e.g., discriminator loss), and update the parameters of the machine learning model to reduce the losses, such as by updating weights or bias parameters of the machine learning model.

The system can leverage generative adversarial network (GAN) techniques to improve feedback provided to users and user performance. For example, a user can be treated as a generator in a GAN where the system determines generator loss as differences between feature values of a user's recorded video and target feature values, ranges, or series generated from extracted features of a set of previously recorded videos. The system can provide information based on these loss calculations to the user. The losses can indicate, for example, a feature whose value did not meet a corresponding target value or range, a direction for the value to change to approach the target value or range, or a magnitude for the value to change to meet the target value or range. For example, if a user had 65% eye contact in a recorded video and the target range for eye contact is any percentage between 85% and 100%, the system can provide an indication that a problematic area for the user was eye contact, that they need to increase their level of eye contact during the practice interviews, and that they should increase their eye contact by at least 20%.

The target values, series, or ranges can be generated from feature values for videos that were classified in a particular performance level classification by the machine learning model, such as the performance level classification indicating the highest video quality. A target value can be determined by the system taking an average of the feature values for a particular feature, such as calculating the mean, identifying a median, or identifying a mode. The system can determine a target range by identifying a minimum and maximum value among the feature values in the high-quality group, or by applying a standard of deviation to the feature values. The system can also or alternatively determine a target series or range by identifying a set of the most common feature values for a particular feature. For example, the system can identify that videos that were classified by the machine learning model in the highest performance classification most commonly wore a blue or a white shirt and, therefore, generate a target series that includes only the values of blue and white for shirt color.

In some implementations, the system uses multiple discriminator models for different scenarios such as when users are performing practice interviews for a particular company or for a particular role. These multiple discriminator models can be trained using different sets of training data. For example, different companies and different roles may use different sets of prompts that are presented to users, different formats that, for example, provide different prompt preparation times for the users and require different prompt response times from the users, and different feature criteria for feature value extraction from videos recorded by the users. Accordingly, the training data for the multiple discriminator models can vary in which recorded videos are used to generate the training data, the feature values that are extracted from the same recorded videos, or a combination of the two.

In some implementations, the machine learning model is updated over time using updated training data. The updated training data can include training data generated using different or additional videos, such as those newly recorded or recorded by new users. Alternatively, the updated training data can include training data generated from the same set of videos that were previously used to train the machine learning model. For example, the updated training data can include the same sets of extracted feature values that were previously used to train the machine learning model, however the labels for the videos may be changed. As an example, the system can obtain information from social media profiles of users who previously recorded practice interview videos and determine from the information whether the users were successful in actual interviews. If a user is determined to have succeeded in an actual interview, then the user's videos that are inferred to be similar to the successful video (e.g., due to ratings of the user or being created at around a similar time) can be updated to indicate that the videos should be classified in a performance classification for high quality or high likelihood of a successful outcome. The machine learning model can then be retrained using the updated training data that includes these updated labels. The target feature values, ranges, or series can also be updated using the feature values extracted from videos of users who were determined to be successful in their actual interviews.

FIG. 1 is a diagram that illustrates an example system 100 for using a machine learning model to evaluate video and provide evaluation results for presentation on a computing device. The system 100 includes a server system 120, data storage 130, a computing device 104, and a communication network 140. The server system 120 uses a discriminator machine learning model 122 to generate performance metrics for recorded videos. The computing device 104 is a device of a user 102 and is used to record videos of the user 102 and to transmit them to the server system 120 for evaluation. The data storage 130 represents data storage that can be accessed by the server system 120. The data storage 130 can be used to store, for example, recorded videos 132 used to train the discriminator model 122 and also newly-recorded videos 134 for evaluation, which can also be used to train the discriminator model 122.

The discriminator model 122 can be trained to classify recorded videos of users into different performance level classifications. The performance level classifications can represent, for example, different quality levels for the recorded videos, or different probability ranges of the users succeeding in actual interviews (e.g., achieving outcomes such as getting hired, getting a second interview, etc.) The discriminator model 122 can be trained in a manner that aligns the predictions and outputs of the model 122 with the results of third-party automated systems and actual hiring results. For example, the system 120 can label videos that users create based on outcomes observed after those users provide similar videos to third-party systems. As a result, the system can calibrate the training process with results achieved based on analysis of the third-party systems and the model 122 can learn the combinations of characteristics that most commonly produce desired outcomes.

The system 100 enables users, such as the user 102, to create practice video interview recordings. The user's computing device 104 can access a user interface for the system, such as user interface 112, for capturing a video. The user interface 112 can be provided by a web page, web application, native application, or other functionality accessed by the computing device 104. The user interface 112 can provide interactions that are comparable to those of third-party interview platforms, to simulate the experience of recording a video interview in one of the third-party platforms. The server system 120 can then provide, e.g., through the application, a practice interview interface 112 that allows the user 102 to make a new video recording that include their responses to a number of prompts for the practice interview. These prompts may be preselected or randomly selected from one or more pools of available prompts, such as a pool of available prompts that are specific to a particular company or particular role and a pool of generic prompts that are frequently provided to interviewees across multiple companies and roles.

The computing device 104 can be a computing device, such as a desktop computer, a laptop computer, a mobile phone, a smart phone, a personal digital assistant (PDA), a tablet computer, or other computing device. The computing device 104 can communicate with server system 120 over, for example, the network 140. The computing device 104 can include or be connected to a camera 106.

The camera 106 can be a built-in camera of the computing device 104 or a camera connected to the computing device 104, such as through a wired or wireless connection (e.g., Bluetooth). As an example, the camera 106 can be a webcam built into a display of the device 104 or fitted to a display of the device 104. The camera 106 can be used to record video data of the user 102. For example, the user 102 can operate the device 104 to record a video 110 using the camera 106 of the device 104. The camera 106 can have a field of view (FOV) 108 that, for example, corresponds to a live-video-feed interface element 116 described in more detail below.

The network 140 can include public and/or private networks and can include the Internet. As an example, the network 140 can be a cellular network or a wired local area network or wide area network.

The server system 120 can include one or more computing devices, such as one or more servers. The server system 120 can communicate with the computing device 104 over the network 140. The server system 120 can communicate with other computing devices, such as those belonging to other users who have previously recorded practice interview videos or those who intend to record a practice interview video. The server system 120 can communicate with the computing device 104 and other computing devices through one or more application programing interfaces (APIs). The server system 120 can be part of a cloud computing platform (e.g., Amazon Web Services (AWS), Microsoft Azure, and so on).

The server system 120 has associated data storage 130. The data storage 130 can be, for example, a database used to store and index different data elements such as the recorded videos 132 and the newly-recorded videos 134. The data storage 130 can be used to store other information. For example, the data storage 130 can be used to store extracted feature value sets (e.g., feature vectors) for the recorded videos 132 and/or the newly-recorded videos 134 to be evaluated. The data storage can also store ratings that users provide, as well as data indicating outcomes resulting from user's use of third-party video interview platforms.

The user 102 can initiate a start of a practice interview through an interface provided on a display of the computing device 104. The interface can be provided, for example, by an application running on the computing device 104, a web-based application provided by the server system 120, or through a web page provided by the server system 120.

As an example, the user 102 can interact with an interface element to select a practice interview (e.g., "Practice Interview 10") and a second interface element to start the practice interview. After initiating the practice interview, the camera 106 can start recording video data.

During the practice interview, the user 102 can be presented a set of prompts. These prompts can be presented visually, such as on a display of the computing device 104, or audibly through speakers of the device 104 or headphones worn by the user 102 and connected to the device 104. As part of the practice interview, the user 102 responds to each of the set of prompts and the device 104 records the user 102's responses.

As an example, after initiating the start of a practice interview, the device 104 can present an interface 112 that includes a current prompt 114 and the live-video-feed interface element 116 showing the recorded video to the user as it is recorded. The prompt 114 can be selected from a predetermined set of prompts for the practice interview (e.g., for Practice Interview 10) or selected from one or more pools of available prompts. For example, the server system 120 may randomly select ten prompts to present to the user 102 over the course of the practice interview from a pool containing thirty prompts. The pool of prompts can be for a particular practice interview, for a particular company that the user 102 has selected for the practice interview (e.g., the user 102 is interested in seeking an actual interview with the company), for a particular role that the user 102 has selected for the practice interview (e.g., the user 102 is interested in applying to multiple software companies as a software engineer), or for a particular role at a particular company that the user 102 has selected for the practice interview (e.g., the user 102 initiated a practice interview for a software engineer role at Company A).

In some implementations, there are multiple pools of prompts that the server system 120 selects prompts from. For example, the server system 120 can identify a first pool that includes prompts for a specific company, role (e.g., electrical engineer, office manager, IT consultant, etc.), or field (e.g., software, chemistry, art history, graphic design, etc.) and a second pool that includes generic prompts. For a practice interview, the server system 120 can select one or more prompts from the first pool and one or more prompts from the second pool.

In some implementations, there are one or more particular prompts that are included in the set of prompts presented to the user 102 during a practice interview. The one or more particular prompts can be included for every practice interview or be included for every practice interview that meets certain criteria, e.g., company, role or field, etc.

In some implementations, the prompts are generated during the practice interview or at in response to an indication that the user 102 has started a practice interview. For example, the server system 120 can generate prompts using prompt templates and filling in the templates using words or phrases selected from different pools of words or phrases (e.g., that are specific to a particular company or role).

The practice interview can have a specific format. For example, as will be described in more detail below with respect to FIGS. 4A-4D, the practice interview can include a set number of prompts, a set prompt preparation time for the user 102 to be presented the prompt before recording starts or resumes, and a set response time for the user 102 to provide a response to the current prompt. For example, the user 102 may have been shown the prompt 114 for a set amount of time (e.g., 10 seconds, 30 seconds, etc.) before recording starts and the user is presented the interface 112. Once the interface 112 is presented to the user, a new timer may start requiring the user 102 to provide a response to the prompt 114 in a set amount of time (e.g., 1 minute, 2 minutes, etc.) and require the user 102 to respond within that time before the next prompt is presented to the user 102 or the practice interview ends.

Over the course of the practice interview, video data 110 of the user 102 is recorded. The video data 110 can be a full video recording from the start of the practice interview to the end of the practice interview. Alternatively, the video data 110 can be a collection of videos or a collection of videos combined into a single video. For example, the video data 110 can include ten 1-minute videos, each containing a response to a prompt presented during the practice interview.

The recorded video data 110 can be transmitted by the device 104 to the server system 120. The recorded video data 110 can be transmitted as a single data package or as multiple data objects, e.g., as videos each containing a response to a prompt presented to the user 102.

As will be discussed in more detail with respect to FIGS. 3A-3B, after receiving the recorded video data 110, the server system 120 can process the video data 110 and extract feature values from the video data 110. Processing the video data 110 can include, for example, sampling video frames, reducing resolution of video frames, segmenting the videos, sampling the audio, etc. Extracting video feature values can include identifying or determining, from the processed video, values for different audio characteristics and video characteristics of the recorded video data 110. These audio and video characteristics can include, for example, a measure of eye contact maintained by the user 102 during the practice interview, a number of unique voices detected, a number of objects in the user 102's background, keywords that are detected, a number of keywords detected, etc.

In some implementations, the types of features that values are extracted for or the rules used for extracting features is based on particular criteria. For example, the types of features that values are extracted for or the rules used for extracting features can be different for different companies, roles, or fields that the practice interview is for. In more detail, for practice interviews in the software field, the server system 120 can use a first list of keywords to try and identify from the video data 110. These keywords in the first list of keywords can include buzzwords for the software field that may provide a boost to the user 102's resulting performance if mentioned by the user 102 during the practice interview and detected by the server system 120 during feature value extraction. The first list of keywords can also or alternatively include keywords that are often overused in the software field that can decrease the user 102's resulting performance if mentioned by the user 102 during the practice interview and detected by the server system 120 during feature value extraction. However, if the practice interview is instead a practice interview for a role in the education field, then the server system 120 may use a different list of keywords when attempting to detect keywords from the user 102's speech in the recorded video data 110.

As an example, the server system 120 can extract a set of feature values for the video data 110. The extracted features can include a feature value of three for the audio characteristic of distinct voices during the interview to indicate that three distinct voices were detected in the recorded video data 110. The distinct voices may belong to the user 102 and the user 102's two children depicted in the live-video-feed element 116. The server system 120 can also extract a value of three for the visual characteristic of number of objects detected in the background of the user 102 during the practice interview (e.g., a first object for a table, a second object for a first child or person, and a third object for a second child or person). The server system 120 can also extract a value of 0.4 for another visual characteristic for the user 102's position in the FOV 108 of the camera 106 during the interview. The value 0.4 can represent, for example, the average percent of overlap that user 102's representation in video data 110 had with respect to an ideal or recommended position area 118 for the user 102 as depicted in the live-video-feed element 116. This position area 118 may be presented in the interface 112 as a guide for the user 102 during the practice interview or may not be presented to the user 102 during the practice interview.

The server system 120 can provide the extracted features values as input to the discriminator model 122. For example, the server system 120 can provide the extracted feature values as an input vector to the discriminator model 122. The discriminator model 122 can be a machine learning model trained to recognize a performance level for the user 102 during the practice interview based on extracted features values. For example, the discriminator model 122 can be trained to classify the recorded video data into a poor performance level classification indicating poor interview quality or a lowest range of probabilities of the user 102 succeeding if the practice interview was an actual interview (e.g., 0-25% probability of the user 102 being given a job offer or being asked to a second interview), a medium or average performance level classification indicating average interview quality or a middle range of probabilities of the user 102 succeeding if the practice interview was an actual interview (e.g., 26-74% probability of the user 102 being given a job offer or being asked to a second interview), and an excellent performance level classification indicating excellent interview quality or a highest range of probabilities of the user 102 succeeding if the practice interview was an actual interview (e.g., 75-100% probability of the user 102 being given a job offer or being asked to a second interview).

The server system 120 can obtain one or more outputs from the discriminator model 122 and use the outputs to determine a classification for the video. For example, the server system 120 can use the outputs to classify the video into one of the multiple performance level classifications described above. The output of the discriminator model 122 for the video data 110 can include, for example, a value for each of the multiple classifications where each value represents a probability or confidence that the video data 110 should be classified in each of the classifications. The server system 120 can classify the video data into the performance level classification associated with the largest value in the discriminator model 122's output for the video data 110.

The server system 120 can generate or compile performance metrics 126. The performance metrics 126 can include a classification for the video data 110. For example, the performance metrics 126 can include an indication of the classification selected for the video data 110, e.g., whether the server system 120 classified the video data 110 into the poor performance level classification, the average performance level classification, or the excellent level classification. The performance metrics 126 can also include some feature values (e.g., inputs to the model 122) extracted by the server system 120 from the video data 110. Additionally or alternatively, the server system 120 can provide target zones indicating desired values or ranges for characteristics of a video. These target zones can indicate the range or set of characteristics most likely to result in the highest performance level classification, which represents high likelihood of a desired outcome resulting from a video. These target zones can be indicated as target values, ranges of values, or series of values for the feature values, as discussed in more detail below with respect to FIG. 3B. The target zones can provide references for the user 102 to compare characteristics of his video with respect to the ranges of characteristics of high-quality videos.

The server system 120 can provide the performance metrics 126 to the computing device 104 for presentation to the user 102 as feedback for the practice interview. For example, in response to receiving the performance metrics 126, the computing device 104 can present the interface 152 on a display of the device 104 that includes the classification 154 (e.g., overall score) for the video data 110, a set of feature values extracted from the video data 110 or normalized scores 156 generated from feature values extracted from the video data 110, and a set of suggesting 158 to improve the user 102's future practice interview videos. These suggesting can be based on, for example, those feature values that did not meet corresponding target zones and/or feature values that are determined to have the most significant impact on the classification 154 (e.g., determined through the server system 120 running one or more simulations using potential feature values).

The server system 120 can provide the data that the client computing device 104 uses to render the various interfaces presented to the user during the practice interview process. For example, the server system 120 can provide user interface data for the video interview interface 112 and the video interview interface 152 through an application on the computing device 104, a web page accessed by the user 102 through the computing device 104, a web application accessed by the user 102 through the computing device 104, etc. The video interview interfaces provided by the server system 120 can include prompts (e.g., questions) that the user 102 is asked or expected to respond to, interface elements that display a live feed of the camera 106 of the computing device 104, interface elements that display image data from video recordings of the user 102, performance metrics indicating the user 102's interview performance in a particular video recording or interview performance across multiple video recordings (e.g., for the same company or for the same role), etc. The server system 120 can provide various other video interview interfaces and interface elements for the video interview interface as described in more detail below with respect to FIGS. 4A-4D.

Figure 2:
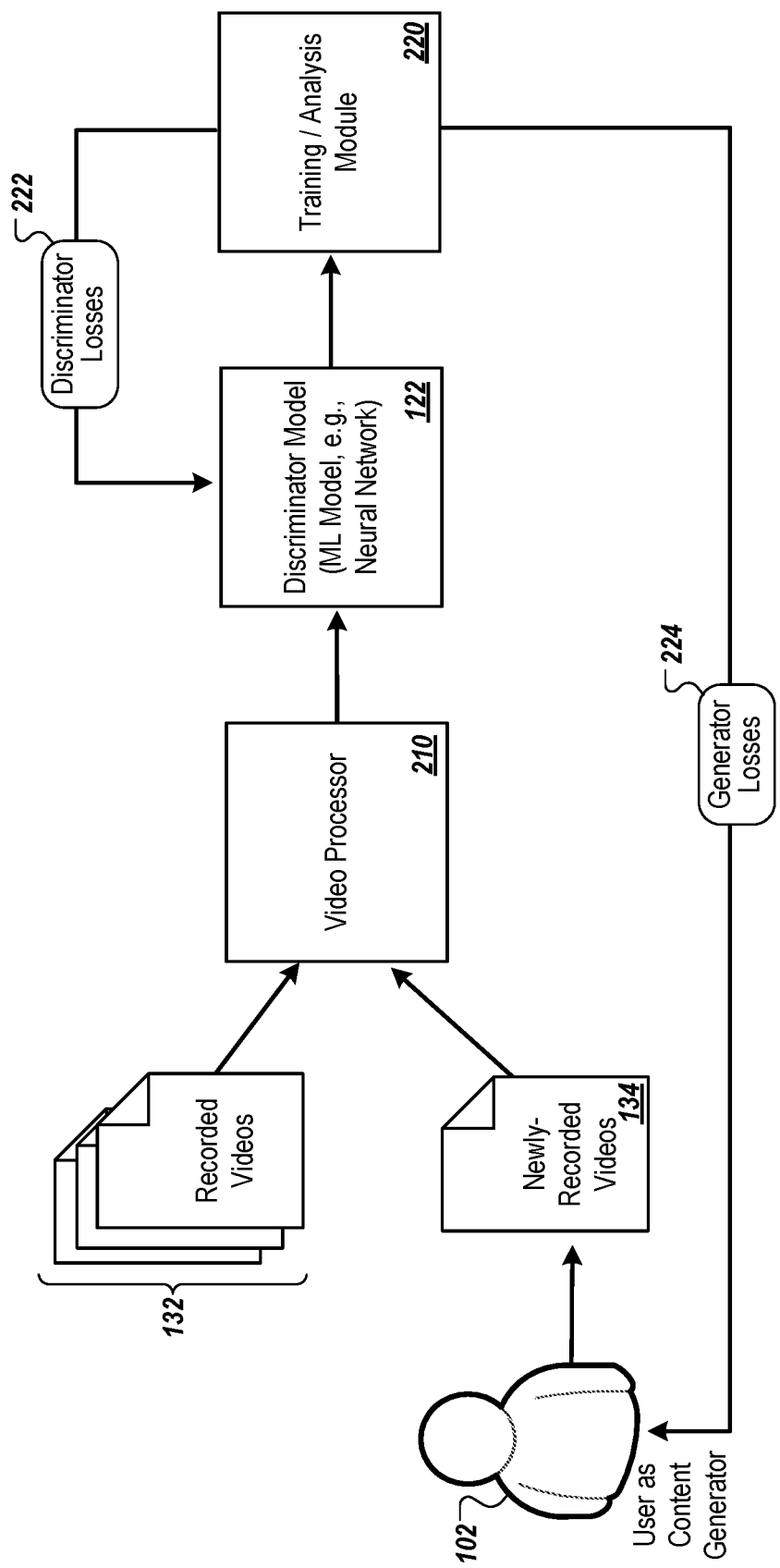
FIG. 2 is a diagram that illustrates an example block diagram for a system that trains and uses a machine learning network to evaluate video.

FIG. 2 is a diagram that illustrates an example block diagram for a system that trains and uses a machine learning network to evaluate video. The system can include a video processor 210 to process sample videos and user-recorded videos, the discriminator model 122, and a training and analysis module 220 to analyze outputs of the discriminator model 122, generate losses based on the outputs, and train the discriminator model 122. The system can be the server system 120 described above with respect to FIG. 1.

The video processor 210 can process video data that it receives. The video processor 210 can process visual data in the video data and audio data in the video data. For example, for each of the videos that it receives, the video processor can sample the video frames in the video at a particular sampling frequency, reduce resolution of the video frames in the video, and segment the video into multiple segments that substantially include the same number of video frames and/or that cover the same length of time. The video processor 210 can also perform audio processing techniques by, for example, sampling the audio of the video data. By processing the received videos, the server system 120 can significantly reduce the time and processing required to extract feature values from the recorded videos 132 and newly-recorded videos 134.

To facilitate training of the discriminator model 122, the recorded videos 132 can be provided to the video processor 210. The processed sample videos can then be used as inputs for the discriminator model or used to generate inputs for the discriminator model 122 as described in more detail below with respect to FIG. 3A.

The outputs of the discriminator model 122 during training are obtained by a training and analysis module 220. The training and analysis module 220 can determine model classifications for the recorded videos 132 from the outputs of the model 122 and compare them to actual classification labels for the recorded videos 132. These classification labels can be set based on information from a number of sources, such as a rating provided by the user that generated the video (e.g., a self-assessment by the user), a rating provided by another user (e.g., a peer user of the system 100), or can be determined by the system based on other outcomes (e.g., social media profile data indicating hiring of the user at a job the user practiced interviewing for, survey results from the user indicating a successful interview, etc.).

The training and analysis module 220 can use the model classifications for the sample videos and the actual classifications for the sample videos to generate model losses 222. The module 220 can generate the discriminator losses 222 using a loss function that estimates how closely an output of the discriminator model 122 (e.g., a vector indicating a probability distribution over the set of model classifications) for a video matches the corresponding training target for the video (e.g., the actual classification indicated by the label for the video). For example, the module 220 can process each of the recorded videos 132 (e.g., recorded videos respectively created by different users) to obtain an output vector of the discriminator model 122 for each recorded video 132. The system can then compare the discriminator output for each video 132 with the corresponding label for the video and use backpropagation of error to adjust model parameter values to provide a prediction with greater accuracy.

In some implementations, the system trains the discriminator model 122 using batches of videos as is often done for GANs. The system can attempt to (i) maximize the predicted probability for the high-performance classification (e.g., maximize the score for that classification) that the discriminator model 122 produces for videos with high ratings or successful outcomes, and (ii) minimize the score for the high-performance classification that the discriminator model 122 produces for videos with low ratings or unsuccessful outcomes. However, rather than making adjustments based on individual examples alone, the system can average the loss over a batch of examples. The system can use a composite loss that maximizes the average probability (e.g., average score) that a set of highly-rated or successful videos will be classified into the high performance classification. Similarly, the system can use a composite loss that maximizes the average probability (e.g., average score) that a set of low-rated or unsuccessful videos will be classified into the low performance classification. The model losses 222 can be applied to parameters of the discriminator model 122, such as weights or bias values, or can be used by the module 220 to determine adjustments to the parameters of the discriminator model 122 (e.g., to improve the classification accuracy of the discriminator model 122).

After the discriminator model 122 is trained, the system can be used to assess newly-recorded videos 134 that users record. The video processor 210 can be provided the newly-recorded videos 134 after they are generated by user 102 (or by other users). The video processor 210 can process the newly-recorded videos 134 in the same or similar way as for the recorded videos 132. The processed newly-recorded videos 134 can be provided as input to the trained discriminator model 122 or used to generate inputs for the trained discriminator model 122.

The outputs of the trained discriminator model 122 can be used by the training and analysis module to classify each of the newly-recorded videos 134 into one of multiple performance level classifications. For example, the discriminator model 122 can be a neural network that provides an output vector having a probability value for each of the multiple possible classifications (e.g., low, medium, and high quality, or low, medium, and high likelihood of interview success). To select a classification for a video, the training and analysis module 220 can identify the highest value in the discriminator model 122's output vector for a particular video (e.g., from an output vector generated in response to the model 122 receiving a feature vector for the particular video as input). The system can classify the video into the classification that is associated with the highest value from the output vector.

The classifications may be stored by the server system 120 shown in FIG. 1. For example, the server system 120 can store the newly-recorded videos 134 and then update metadata for the newly-recorded videos 134 to reflect their classification. Alternatively, the server system 120 can store the classifications in or as one or more data objects that are associated with the newly-recorded videos 134, e.g., through unique identifiers for the newly-recorded videos 134.

The system can leverage generative adversarial network (GAN) techniques to improve feedback provided to the user 102, user performance during practice interviews, and video quality. For example, the user 102 can be treated as a generator of the newly-recorded videos 134 in a GAN that includes the discriminator model 122. The training and analysis module 220 can generate generator losses 224 and provide them to the user 102 (e.g., through the computing device 104). In a traditional GAN, the discriminator provides gradient information used to update the parameter values of a generator model. In the present system, the same information is used not to adjust a model, but to provide feedback indicating how the user 102 can change characteristics of generated videos (e.g., how the user can speak and act differently) to increase the likelihood of the videos being classified in the high-performance classification. While the system can assess the differences of single videos, the system can also assess the differences or losses across sets of videos, such as multiple videos a user has created or by looking at collections of segments within a video the user created.

Other techniques can be used to provide feedback based on the training state of the discriminator model 122. For example, the system can classify different videos to determine how the model would classify them. The classified videos may include recorded videos 132 used for training or others. Then, using the scores or classifications determined using the discriminator model 122, the system can group the videos that are classified similarly. For example, the system can identify groups that had a score of 0.8-1.0 for the high-performance classification, groups that had a score of 0.6-0.79 for the high-performance classification, and so on. The system can then determine the properties shared by or most common among the highest-scoring group, by looking at the input feature vectors for those videos. The values and ranges of values represented in the input feature vectors for the highest-scoring group can be set as target zones for what is most likely to lead to the high performance classification. For example, analysis of a group or cluster of videos with scores of 0.8-1.0 for the high-performance classification may reveal that these videos had between 0 and 4 pauses longer than 3 seconds, had average speaking rates of 140 to 160 words per minute (wpm), had low audio noise, and had visual backgrounds classified as "clean" or "neutral." These characteristics can then be set as the target zones that represent desirable characteristics that are most likely to lead to a video being classified in the high performance classification. With the target zones, the system can compare the characteristics of the newly-recorded video 134 being analyzed with the ranges or values of the target zones, to give the user indications of the changes that would make the video more likely to achieve the high performance classification. These outputs can indicate, for example, a feature whose value did not meet a corresponding target value for the feature, was not within a target range for the feature, or was not among a series of values for the feature. The feedback can additionally or alternatively indicate a direction for that a feature value to change to approach the target value or target range, or a magnitude for the value to change to meet the target value or get within the target range. For example, if a user 102 had 65% eye contact in a recorded video and the target range for eye contact is any percentage between 85% and 100%, the module 220 can provide an indication that a problematic area for the user was eye contact, that they need to increase their level of eye contact during the practice interviews, and that they should increase their eye contact by at least 20%.

The server system 120 can also align output of the discriminator model 122 with the results from an inaccessible third-party system. The third-party system can be a third-party interview screening or assessment system used by one or more companies (e.g., an artificial intelligence or machine learning platform). The server system 120 can calibrate its output with respect to third-party systems with multiple levels of feedback. For example, user-reported feedback can provide ratings that the user 102 and/or other users provide for their own videos. This provides a high volume of example video data for training and basic classification labels showing how different videos can be ranked or classified relative to each other. The server system 120 can then use instances of objective outcomes, such as actions taken following video interview submissions to the third-party systems, to calibrate or correlate the self-reported ratings with objective results. For example, different people may be have differences in the personal judgments and rating scales that they apply. One person may rate his practice videos at four out of five, and another may rate his practice videos of similar quality and content at two out of five. When these users create and submit videos through a third-party system, the users can report additional information such as ratings they would give to their submitted video as well as results achieved (e.g., whether they passed the screening and continued with the interview process, whether they were hired, etc.). Even without access to the submitted videos and without access to the outputs of the third-party system, the server system 120 can use the additional information to calibrate its output and align it with the third-party system.

As an example, the user 102 user can rate the practice video 110 as three out of five, and then indicate that a different video submitted to a third-party analysis platform would also receive the same score. If the submitted video led to a desired result or outcome (e.g., further consideration, a job offer, etc.), the server system 120 can label the user 102'a practice videos scored at three and above as likely to lead to a successful outcome. As another example, a second user may rate their recent practice videos as four out of five, and then indicate that a different video submitted to a third-party analysis platform would also receive the same score. However, if the submitted video led to an unfavorable result (e.g., a rejection or failure to be considered further), the server system 120 can label the second user's videos scored four and lower as being are likely to fail to achieve the desired outcomes. In this manner, the server system 120 can use self-reported ratings from users to generate strong training data sets, even though the users' personal rating scales may weight different characteristics differently. The server system 120 can further improve accuracy by obtaining other information about the users, such as job qualifications and job history (e.g., from a resume, curriculum vitae, social media web page, etc.), and using this data to control for other factors that may affect the outcomes that users report. For example, across the set of users that report outcomes for a company or position, the server system 120 can control for job qualifications in, to avoid labelling videos as being of poor quality when in fact the user's qualifications other than the video interview were likely to have had a larger influence on a negative outcome.

The server system 120 can request self-reported feedback from users. For example, after receiving the video data 110 shown in FIG. 1, the server system 120 can present a user interface to the user 102 that allows the user 102 to provide input indicating a quality of the video such as a star rating or responses to one or more questions regarding video quality.

In determining objective outcomes that the server system 120 can use to calibrate the feedback of users, the server system 120 can continually request information from users regarding outcomes. For example, the server system 120 can periodically (e.g., once a week, once a month, once every six months, etc.) ask users if they have recently participated in an actual interview (e.g., through a third-party system). If their response indicates that they did, the server system 120 may ask them to provide feedback on their actual interview (e.g., overall score of 4/5, verbal of 3/5, visual of 5/5, and vocal of 4/5) and an outcome of the actual interview. The outcome can be that they passed screening or did not pass screening by a third-party system. The outcome can be that they were granted or not granted a second or further subsequent interview. The outcome can be that they were hired or were not hired.

In some implementations, in determining objective outcomes that the server system 120 can use to calibrate the feedback of users, the server system 120 obtains outcomes from profile pages of users such as social media profile pages. For example, the server system 120 can continually (e.g., periodically) access a social media profile (e.g., LinkedIn profile) for a user to determine if the user has recently been hired or not. If a user is determined to have been hired somewhere new, the server system 120 may send a request to the user to have them provide feedback for their actual interview that resulted in the hiring.

In some implementations, calibration of feedback by the server system 120 is performed in view of video context, user background, or a combination. As will be described in more detail below, video context can include a company, role, industry, or combination thereof that a user is performing a practice interview for. Certain users may provide different precisions of video feedback with respect to outcomes for different contexts. For example, when the user 102 provides feedback of 3/5 or better for videos with a context of Industry 1, this can indicate likely to lead to a successful outcome based on past outcomes. However, when the user 102 provides feedback of 3/5 for videos with a context of Industry 2, this may not indicate likely to lead to a successful outcome. Instead the server system 120 may determine that only when the user 102 provides feedback of 5/5 for videos with a context of Industry 2 is it likely for a video to lead to a successful outcome. Based on this, the server system 120 may calibrate users' self-reported feedback according to context.

The differences in precision can be based on a user's knowledge or experience with a particular context, such as with a particular company, role, or industry. The server system 120 can lookup background information for users and use the background information to perform an initial calibration for the user's self-reported feedback. For example, based on the user 102 having 10 years of experience as an engineer and 0 years of experience as a graphic designer (e.g., as determined from a social media profile for the user 102 or from information requested from the user 102), the server system 120 may initially calibrate the user 102's feedback for context of engineer roles as 3/5 indicating likely to lead to a successful outcome and for the context of graphic designer roles as 5/5 indicating likely to lead to a successful outcome.

Figure 3A:
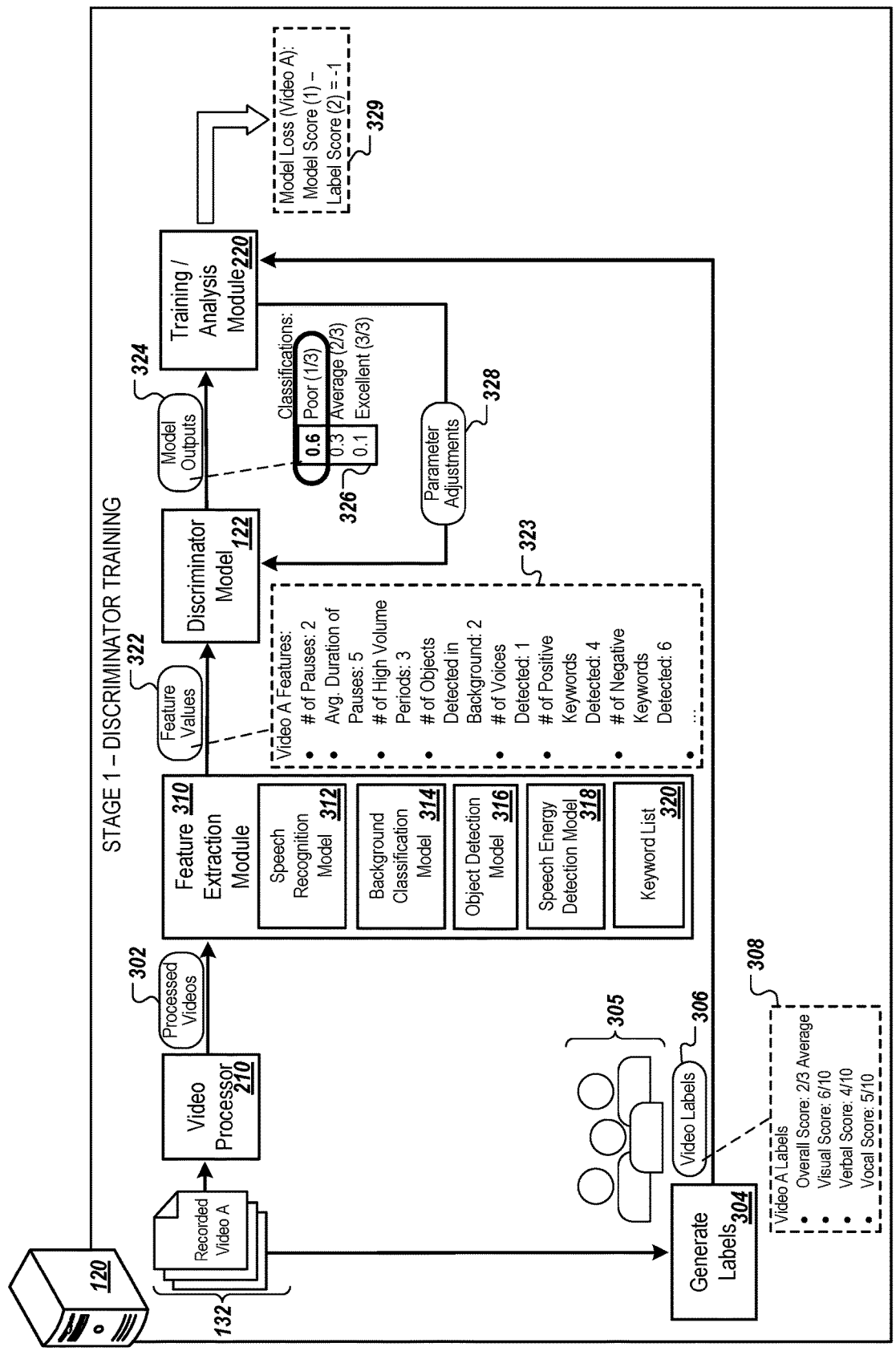
FIGS. 3A-3B are example diagrams that illustrate training a machine learning model and using the machine learning model to evaluate video.
Figure 3B:
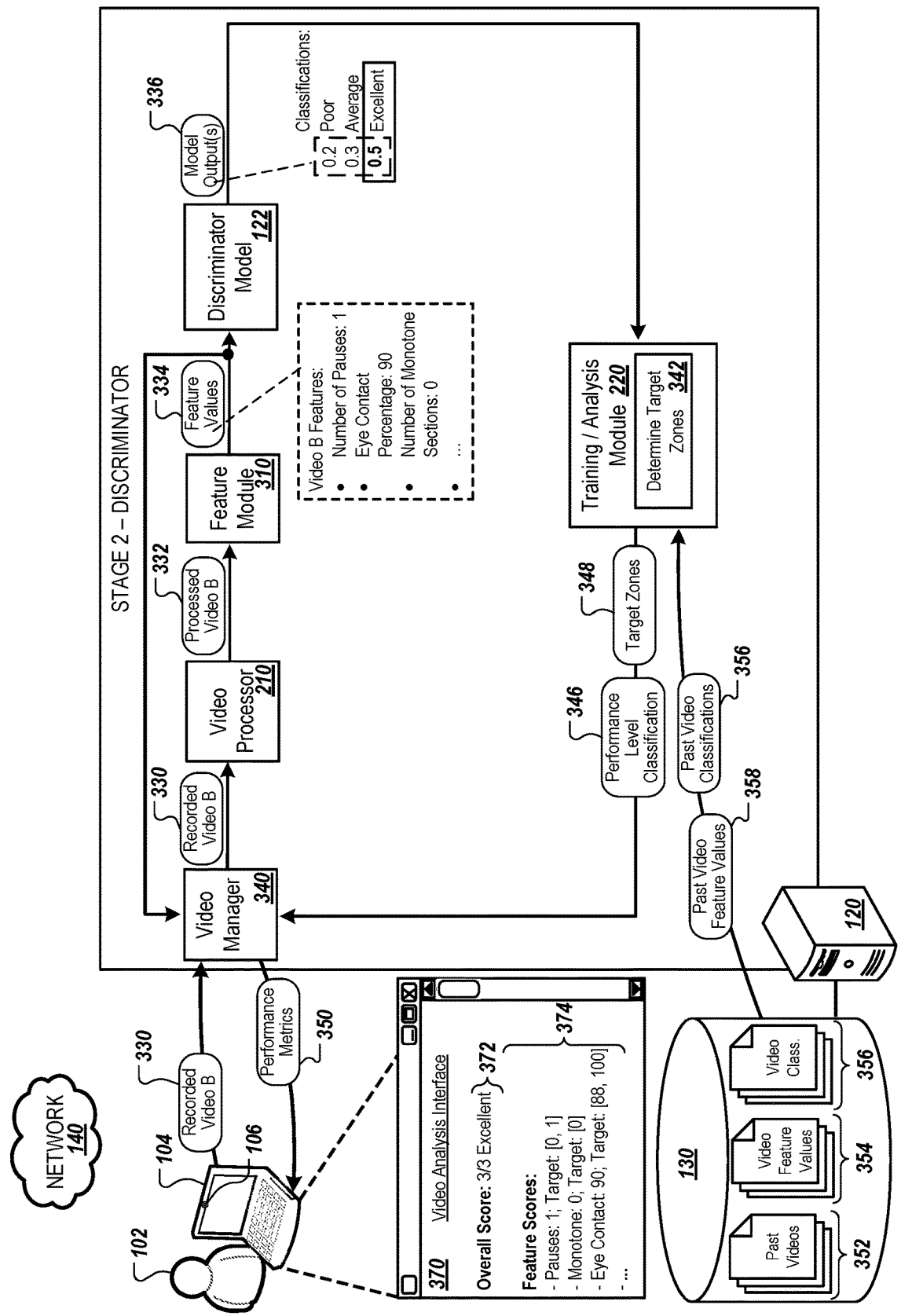

FIGS. 3A-3B are example diagrams for a system for training and using a machine learning model to evaluate video. For example, the server system 120 can train the discriminator model 122 and use the trained discriminator model 122 to evaluate a video by classifying a video into one of multiple performance level classifications. The classifications may represent, for example, levels of quality of the video, likelihoods of the video achieving a result (e.g., passing job applicant screening), and so on.

FIG. 3A is an example diagram that illustrates using the server system 120 to train the discriminator model 122 to classify videos into multiple performance level classifications using training data. As will be described in more detail below, the training data can include feature values extracted from a set of videos used for training the discriminator model 122 and labels generated for the set of videos.

As described above with respect to FIG. 2, the video processor 210 can process video data that it receives. During training of the discriminator model 122, the server system 120 can provide the recorded videos 132 as input to the video processor 210. After receiving the recorded videos 132, the video processor 210 can process the recorded videos 132 to generate the processed videos 302 by, for example, sampling the visual data in the videos, sampling the audio data in the videos, and segmenting the videos. For example, the videos may be re-sized into a standard format that reduced the information to be processed, such as a resolution of 400×300 pixels and a rate of 2 frames per second. This adjustment to the videos can help reduce the amount of noise (e.g., insignificant data) that may affect model output, and can also increase speed and efficiency of processing by requiring fewer computational resources. The video processor 210 can provide the processed videos 302 as input to the feature extraction module 310.

The feature extraction module 310 can extract feature values from the processed videos 302 and generate, for each processed video, a feature vector containing a set of feature values for the processed video. The module 310 can extract feature values by identifying or determining, from the processed video, values for different audio characteristics and video characteristics of the recorded video data 110. The module 310 can use different models such as static algorithms or machine learning models to identify and determine features values from the processed videos. For example, the module 310 can include and use speech recognition model 312 to perform speech-to-text conversion or to otherwise identify the words spoken by users represented in the recorded videos 132, a background classification model 314 to classify the backgrounds in the recorded videos 132 into two or more background classifications (e.g., good or not distracting, bad or distracting, etc.), an object detection model 316 to identify one or more objects in the recorded videos 132 or in the backgrounds of the recorded videos 132, and a speech energy detection model 318 to detect a levels of speech volume and/or to detect pauses in speech. The feature extraction module 310 can also include other or additional models to extract feature values for other audio or visual characteristics of processed videos.

In general, the features used in the discriminator model can describe or measure various aspects of a video, including visual, vocal, and verbal characteristics. As a few examples, the features can characterize speaking characteristics such as pauses (e.g., number of pauses in speech, total duration of pauses across the video, length of longest pause, percentage of the video that was silent or non-verbal time), intonation (e.g., amount and duration of periods of monotone speech), speaking speed, speech volume, number of distinct voices recognized, and so on. Features can characterize visual characteristics such as the dominant colors, types and numbers of objects detected in the image data, type of background (e.g., indoor, outdoor, plain, cluttered, etc.), lighting characteristics (e.g., contrast between user's face and the background, lightness or darkness of the video as a whole, etc.). Features can also indicate the state or behavior of the user, such as the heartrate of the user (which the system may detect or infer from high-quality video feeds), eye gaze behavior (e.g., amount of time gazing away from the camera, frequency of shifting toward or away from the camera, etc.), and more. Feature values for the features may be expressed as classifications (e.g., measures falling in one of multiple ranges), counts, numerical values, binary measures whether the feature is present or not, and so on.

The feature extraction module 310 can also include a keyword list 320. The keyword list 320 can include positive keywords, e.g., keywords that are associated with excellent performance. These positive keywords can include important words or phrases that employers or third-party interviewers frequently benefit interviewees for mentioning during an interview. Another keyword list 320 can be provided for negative keywords, e.g., keywords are associated with poor performance. These negative keywords can include, for example, overused or frequently misused words or phrases (e.g., "seriously," "like", "for all intents and purposes," etc.), filler words or phrases (e.g., "um," "uh," "you see," "you know", etc.), or profanity. Each keyword in the keyword list 320 can include one or more words or sounds. A keyword in the keyword list 320 can be a phrase of multiple words. The feature extraction module 310 can use the keyword list 320 with the speech recognition model 312 to detect keywords spoken in the recorded videos 132.

The presence of a keyword, or the number of instances of keyword use for different keyword lists can be a feature value provided as input to the discriminator model. For example, the feature values provided can include (i) a count of instances that any keywords in a positive keyword list were spoken (e.g., 5 positive keyword instances detected) and (ii) a count of instances that any keywords in a negative keyword list were spoken (e.g., 3 negative keyword instances detected). In addition, different keyword lists can be used for different contexts (e.g., for different companies, industries, roles, positions, or prompts). For example, the set of positive keywords may be different for different questions or prompts, since a high-quality response needs to address the subject matter of the prompt and that subject matter may change from one prompt to the next.

In some implementations, in extracting feature values from the processed videos 302, the feature extraction module 310 can apply different thresholds or ranges to the processed videos 302 or to output of the models in the feature extraction module 310. For example, to determine a number of high-volume events (e.g., where a user spoke too loudly) in the Sample Video A, the module 310 may use a first audio energy threshold and determine that a high-volume event occurred whenever audio energy (or audio energy from speech) provided by speech energy detection model 318 for the Sample Video A exceeds the first audio energy threshold. The first threshold can be or represent a particular decibel level that indicates a cutoff of acceptable speech volume. The module 310 can use a second audio energy threshold that is less than the first audio energy threshold and a time threshold to determine that a speech pause event has occurred. For example, when the audio energy for the Sample Video A falls below the second audio energy threshold for an amount of time greater than the time threshold, then the module 310 can determine that a speech pause event has occurred.

The audio characteristics that the feature extraction module 310 can extract values for can include, for example, a number of times the user 102's paused their speech during the practice interview, the average length of time of the user 102's pauses during the practice interview, the number of unique voices detected during the practice interview, keywords detected from the user's speech during the practice interview, a number of positive keywords (e.g., desirable keywords from a predetermined set of positive or desirable keywords) detected from the user's speech during the practice interview, a number of negative keywords (e.g., undesirable keywords from a predetermined set of negative or undesirable keywords) detected from the user's speech during the practice interview, volume levels of the user's speech during the practice interview, a number of times the user 102's speech volume was above a first threshold volume level, a number of time the user 102's speech volume was below a second threshold volume level, a number of monotone sections of the user 102's speech during the practice interview, an average length in time of monotone sections of the user 102's speech during the practice interview, etc. In determining values for these audio characteristics, the server system 120 can use speech recognition techniques to identify words spoken by a user in each video and speaker diarization techniques (e.g., partitioning an input audio stream into segments according to the speaker identity) to recognize a number of unique speakers in each video and/or audio segments for each of multiple unique speakers.

For example, the feature extraction module 310 can use the speech recognition model 312 or one or more other models (e.g., a speech segmentation model and a speech clustering model) to identify, from audio data of a processed video, different audio segments that each correspond to one of multiple speakers and then combine the segments that correspond to the same speaker. The number of combined segments is the number of unique speakers in the audio data for the video. The feature extraction module 310 can identify the user (e.g., the generator of the video), for example, as the speaker with the largest audio segment. The largest audio segment can be the longest combined segment. The largest audio segment can be the combined segment with the greatest amount of speech energy determined by providing the combined segments as input to the speech energy detection model 318. The feature extraction module 310 can then provide the audio segment for the user to the speech recognition model 312 to obtain text that includes the words spoken by the user.

The video characteristics that the feature extraction module 310 can extract feature values for can include, for example, a percentage of time that the user maintained eye contact during the practice interview, a number of objects in the user's background during the practice interview, types of objects in the user's background during the practice interview, centering of the user 102 in the FOV 108 of the camera 106 during the practice interview, color of clothing worn by the user 102 during the practice interview, etc. In determining values for these video characteristics, the server system 120 can use object recognition techniques, facial recognition techniques, or eye tracking or gaze interaction techniques.

The discriminator model 122 can receive the feature values 322 for the recorded videos 132 from the feature extraction module 310. The feature values 322 can be provided as inputs to the discriminator model 122 and, in response to receiving the feature values 322, the discriminator model 122 can generate model outputs 324.

The discriminator model 122 can be a neural network. For example, the discriminator model 122 can be a deep learning neural network or a convolutional neural network. The discriminator model 122 can have an input layer with a number of nodes, where each node in the input layer is provided a single feature value of the feature values extracted from the video data 110. As an example, a feature vector for the Sample Video A containing the feature values 323 can be provided to an input layer of the discriminator model 122, where each node in the input layer receives a different value in the feature values 323. The model outputs 324 can include a corresponding set of outputs 326 for the Sample Video A generated by the discriminator model 122 in response to receiving the feature values 323.

The discriminator model 122 can include an output layer with a number of nodes where each node in the output layer corresponds to a particular performance level classification. For example, the discriminator model 122 can include a first node for the poor performance level classification, a second node for the average performance level classification, and a third node for the excellent performance level classification.

The output layer of the discriminator model 122 can have an activation function that is used to generate the model outputs 324 from the nodes in the output layer of the discriminator model 122. The activation function can be, for example, a non-linear activation function such as a softmax function. The softmax function can be used to generate, as output of the discriminator model 122, a probability distribution over a set of classifications. For example, the softmax function can be used to generate the set of outputs 326 for the Sample Video A in the recorded videos 132. The set of outputs 326 can include a first output of 0.6 for the poor performance level classification using a value of a first node in the output layer, a second output of 0.3 for the average performance level classification using a value of second node in the output layer, and a third output of 0.1 for the excellent performance level classification using a value in a third node of the output layer. The set of outputs 326 can form a probability distribution for the Sample Video A such that the first output of 0.6 can indicate a 60% probability or likelihood that the Sample Video A should be classified in the poor performance level classification, the second output of 0.3 can indicate a 30% probability or likelihood that the Sample Video A should be classified in the average performance level classification, and the third output of 0.1 can indicate a 10% probability or likelihood that the Sample Video A should be classified in the excellent performance level classification.

In some implementations, the discriminator model 122 can classify videos into more than three performance level classifications. For example, the discriminator model 122 can be configured to classify videos into one of five performance level classifications where a first classification indicates performance failure or a performance grade of F (e.g., probability of success between 0-59%), a second performance level indicates a performance grade of D (e.g., probability of success between 60-69%), a third performance level indicates a performance grade of C (e.g., probability of success between 70-79%), a fourth performance level indicates a performance grade of B (e.g., probability of success between 80-89%), and a fifth performance level indicates a performance grade of A (e.g., probability of success between 90-100%), The discriminator model 122 can be a binary classifier that classifies whether or not a video fits in a single classification. For example, the discriminator model 122 can classify videos into a first performance level classification that indicates a sufficient performance (e.g., sufficient video quality, greater than a threshold probability that the corresponding user would be provided a job offer, etc.) and indicate that the video is outside that classification otherwise (e.g., insufficient video quality, less than the threshold probability that the corresponding user would be provided a job offer, etc.). In more detail, the discriminator model 122 can be a neural network with two nodes in the output layer where the first node corresponds to sufficient user performance during a practice interview and the second node corresponds to insufficient user performance.

The training data for the discriminator model 122 can include the feature values 322. The training data can also include video labels 306 generated for the recorded videos 132 (304). In some implementations, the labels 306 can be created by the same users represented in the recorded videos 132. For example, after completing a practice interview, a user can be asked to complete a self-assessment of their performance in the practice interview. The user's responses can be used as the set of labels that particular practice interview video. As another example, the system can provide recorded videos 132 to other users to review and rate. For example, a group 305 of one or more people can receive and view the recorded videos 132 and, based on what they observe in the recorded videos 132, generate the labels 306 for the sample videos. The group 305 can be a group of selected reviewers who, for example, have sufficient experience generating labels for videos (e.g., have reviewed more than a threshold number of videos or are otherwise experienced or qualified to assign ratings).

The video labels 306 can include a set of one or more labels for each of the videos reviewed by the group 305, e.g., one or more labels for each of the videos in the recorded videos 132. The labels can indicate a human-generated classification for each of the videos in the recorded videos 132. In some cases, other information is used to adjust or change the classification labels. For example, if a user has performed consistently and rated his practice videos consistently, and then reports to the system that he performed successfully in a video interview for an actual job interview, the system can infer that at least the most recent practice videos are similar to the one that was successful. As a result, the system can set those videos as examples of successful or high-performing videos based on the reported success of the user. Similarly, the system can monitor social media profiles (e.g., by periodically retrieving and analyzing social media profile pages) for users of the platform to detect when the users indicate starting a new job. If the job is one for which the user practiced interviewing in the system, the system can infer that the video interview was successful and that the recent practice videos would be of similar quality. This technique enables the system to align the user self-assessment ratings to objective outcomes. For example, a user may rate his videos at 3 out of 5, but end up with one or more successful interview results in third-party platforms. That information signals to server 120 that videos that the user rated at 3 and above should correspond to the high performance classification. Similarly, another user may also rate his videos at 3 out of 5 and may report several failed interviews, signaling to the server system 120 that this user's ratings of 3 and below represent low-quality or low-performance videos. The video labels 306 can be provided to the training and analysis module 220 which can use the video labels 306 and the model outputs 324 to generate losses for the discriminator model 122. In the illustrated example, the video labels 308 generated for the Sample Video A of the recorded videos 132 can include an indication that the Sample Video A is classified in the average performance level classification.

The video labels 306 can include additional labels beyond a simple classification for the video as a whole. For example, the labels 306 can include visual scores that indicate the quality of visual characteristics of the video for the practice interview, verbal scores that indicate quality of word choice and speaking speed characteristics of the video for the practice interview, and vocal scores that indicate quality of audio characteristics such speech energy levels and frequency variation. In some implementations, the discriminator model 122 can be trained to predict these labels also, to give greater information about which aspects of a video led to the overall classification given.

In some implementations, different groups of reviewers are used to generate the video labels 306. For example, a first set of reviewers can be used to review videos of practice interviews for a particular company, a particular role, or a particular field. A second overlapping or non-overlapping set of reviewers can be used to review videos of practice interviews for a different company, a different role, or a different field. The server system 120 can assign reviewers to different groups of reviewers, e.g., for different companies, different roles, or different fields. The server system 120 can assign reviewers based on profile data obtained from one or more social media platforms that the users are on (e.g., LinkedIn, Facebook, etc.). For example, if a LinkedIn profile for a first reviewer indicates that they have ten years of experience working as an electrical engineer and zero years of experience working as a teacher, the server system 120 may assign the first reviewer videos of practice interviews for companies that are known to hire electrical engineers, for engineering or electrical engineering roles, or for the engineering field. The server system 120 can also use the profile information to determine that the first reviewer should not be assigned videos of practice interviews for any elementary, middle, or high schools.

The training and analysis module 220 can obtain the model outputs 324 from the discriminator model 122 and receive the video labels 306. The module 220 can use the model outputs 324 to determine model classifications for the recorded videos 132. For example, the module 220 can determine a poor performance level classification for the Sample Video A based on a first output of 0.6 in the set of outputs 326 being the largest of the outputs in the set of outputs 326.

The training and analysis module 220 can use the model outputs 324 and the video labels 306 to determine the model losses 222 for the discriminator model 122 as shown in FIG. 2. The module 220 can generate the losses 222 using a loss function that estimates how closely a distribution of predictions (e.g., classifications) made by the discriminator model 122 matches corresponding training targets (e.g., the classifications in the labels 306). As an example, the module 220 can generate an error or loss for each video used for training, and can make small adjustments to model parameters based on each video. As another example, the module 220 can use the outputs 324 to generate losses based on model outputs for different groups of recorded videos 132. For each group, the module 220 can determine a different distribution of model outputs, e.g., one distribution of outputs can be for the videos labeled in the high-performance classification, another distribution for videos with labeled in the medium-performance classification, and a third distribution for videos labeled in the low-performance classification. The module 220 can then generate, for each group, loss based on the averaged error of the values in the distribution with respect to the desired value. For example, for videos labeled in the high-performance classification, the system can average the differences between the scores output for that classification (e.g., which may be 0.8, 0.9, 0.6, etc. for various videos) and the ideal score of 1.0 for those videos. This may indicate, for example, that the high-rated videos, on average, scored 0.25 lower than they should for the high-performance classification. Similar losses can be generated for the other groups of videos with respect to their classifications.

As another simplified example, the module 220 can determine a loss for the Sample Video A by determining a distance between the model classification of a "poor performance" classification represented as "1" and the actual labelled classification of "average performance" represented as "2." Due to the model classification being off by a classification position of one in a first direction, the module 220 can determine a loss of negative one for the first sample video.

The training and analysis module 220 can use the model losses 222 to generate a set of parameter adjustments 328 in an attempt to improve the classification accuracy of the discriminator model 122 with respect to the labels 306. For example, the training and analysis module 220 can include parameter adjustments in the parameter adjustments 328 that are expected to improve the outputs of the discriminator model 122 such that a future set of outputs for the Sample Video A includes a value lower than 0.6 for the poor performance level classification and/or a value higher than 0.3 for the average performance level classification.

As an example, where the discriminator model 122 is a neural network, the parameter adjustments 328 can include adjustments to weights for nodes of the neural network. Additionally or alternatively, the parameters adjustments 328 can include adjustments to bias values for nodes of the neural network. At an onset of training or for a number of training iterations the parameters of the discriminator model 122, such as weights and bias values of nodes in the discriminator model 122, may be randomized.

The discriminator model 122 can be trained by server system 120 over numerous iterations. For example, the discriminator model 122 can be trained over thousands or millions of training loops or sessions.

The server system 120 can train multiple discriminator models for different contexts. For example, a model can be trained based on videos recorded for a particular context or situation, with evaluation ratings and real-world outcomes for that particular context or situation being used to provide the training target labels. This can be done with multiple models, each focused on a different context or situation. As a result, multiple models can respectively be trained to maximize accuracy evaluation of videos for separate contexts videos. A primary mechanism for achieving this is to use different sets of training data to train each model, where the training data set for a model is selected based on the context the model is trained to evaluate. For example, a first model to evaluate videos generated for a first context can be trained based on videos recorded for that first context, and with training target labels also determined based on user ratings and real-world outcomes for the first context. A first model to evaluate videos generated for a first context can be trained based on videos recorded for that first context, and with training target labels also determined based on user ratings and real-world outcomes for the first context. As a result, different models can be tuned or customized to provide high accuracy videos recorded for different purposes, target recipients, or other contextual factors.

The contexts can represent factors such as a particular company, role, industry, or a combination thereof for which a video is recorded. As an example, prior to, during, or after recording a new practice interview video, a user can indicate a particular company, role, or industry that the user plans to interview for, which represent a context in which that practice interview video is recorded. This information identifying the company, role, industry, or combinations thereof can be stored as metadata for the practice interview video. When generating training data for a particular one of the multiple discriminator models, the server system 120 can select a set of previously recorded videos that share a particular context. Each of the multiple discriminator models can, therefore, be associated with a particular and different context.

As an example, in training the discriminator model 122, the server system 120 can perform an additional step of selecting a subset of the recorded videos 132. The subset of the recorded videos 132 can be all videos those that were recorded for a particular role, such as a role of Engineer. The server system 120 can select the subset of the recorded videos 132 by accessing the metadata for the recorded videos 132 and identifying those videos whose metadata indicates that the videos were recorded for the role of Engineer. In training the discriminator model 122 for this particular context, the server system 120 may provide the video processor 210 only the subset of the recorded videos 132 such that the processed videos 302 are generated from the subset of the recorded videos 132. In training the discriminator model 122 for this particular context, the server system 120 may provide the group 305 only the subset of the recorded videos 132 such that each set of labels in the video labels 306 is for a particular video in the subset of the recorded videos 132.

In some implementations, a context includes two or more of a company, role, and industry. For example, a discriminator model can be trained using only previously recorded videos whose metadata indicates that they were recorded for Company A and Role 1.

In some implementations, a context includes multiple companies, roles, industries, or combinations thereof. As an example, a discriminator model can be trained using only previously recorded videos whose metadata indicates that they were recorded for (i) Industry X and either (ii) Company A or Company B.

In some implementations, the server system 120 presents users with an interface where they can select a particular context for a new video recording. For example, the user can interact with the interface to select a company, role, or industry from a list of companies, roles, or industries. As another example, the user can interact with search interface element, such as a search bar, to identify a particular company, role, or industry to perform a practice interview for.

In some implementations, the server system 120 determines a context for a video based on other information provided by a user. For example, the server system 120 can present to a user an interface with a questionnaire that includes a list of one or more questions. The server system 120 can use the user's answers to the one or more questions to identify a particular context for the video or to identify a set of possible contexts for the video. The server system 120 can generate a context recommendation for the user based on the identified context or set of possible contexts. In response to receiving an indication of the user approving the recommendation or selection of a particular context in the recommendation, the server system 120 can generate metadata for the video indicating the recommended or selected context.

In some implementations, different contexts are associated with different video recording formats. For example, the server system 120 can use a set of practice interview templates that define one or more of a prompt preparation time, a response time, and a number of prompts for a practice video interview. Each of the templates can be associated with a particular context such that when a user indicates that a new video recording is for a particular context, the server system 120 can select a corresponding practice interview template from the set of practice interview templates and use the selected template to conduct the practice interview (e.g., control the presentation of new or updated interface, what is presented on the interfaces such as particular prompts, and the timing between changes to an interface or to presentation of new interfaces).

In some implementations, different contexts are associated with different sets of prompts. For example, in conducting a practice interview for a user, the server system 120 can select a particular set of prompts from multiple sets of prompts based on a context selected or indicated by the user. A set of prompts in the multiple sets of prompts can be pre-generated to include prompts that are typically asked during interviews with a particular company, for a particular role, in a particular industry, or a combination thereof.

In some implementations, the discriminator model 122 is updated over time using updated training data. The updated training data can include training data generated using different or additional videos, such as those newly recorded or recorded by new users. Alternatively, the updated training data can include training data generated from the same set of videos that were previously used to train the machine learning model. For example, the updated training data can include the feature values 322 that were previously used to train the discriminator model 122, however the labels for the videos may be changed. As an example, the server system 120 can continually (e.g., periodically or in response to triggering events) obtain information from social media profiles of users who previously recorded practice interview videos and determine from the information whether the users were successful in actual interviews. If a user is determined to have succeeded in an actual interview, then the labels for all or a subset of the user's videos can be updated to indicate that the videos should be classified in a higher or the highest performance classification. The discriminator model 122 can then be retrained using the updated training data that includes these updated video labels. The target zones 348 can also be updated using the feature values extracted from videos of users who were determined to be successful in their actual interviews and that were reclassified (e.g., reclassified to the excellent performance level classification).

One of the challenges of processing user-generated videos, both recorded videos 132 used for training and newly-recorded videos 134 for analysis, is that the videos often differ in length. In addition, generating a model 122 to process image data and other features for a long video can be computationally prohibitive, requiring a very large number of model parameters. To address these issues, the discriminator model 122 can be configured to use information about a predetermined length of video that represents only a portion of a typical video. For example, if the videos being analyzed are typically one to two minutes in duration, the discriminator model 122 can be configured to analyze video segments of 10 seconds each. Each input vector can include audio and video characteristics for the particular segment, e.g., pixel data for 20 resized image frames from the 10-second video (e.g., down-sampled to two frames per second) and feature values for various other visual, verbal, and vocal features (e.g., measures of speaking speed, pauses, speech volume, audio noise, visual background type, keywords detected, and so on). As a result, each video processed can include multiple uses of the discriminator model 122. For a two-minute video, that would represent twelve 10-second segments, each with a different input vector of feature values and each resulting in a different output vector of the discriminator model 122. When generating the input vector for a segment, the system may use properties of the image data and audio data in that segment, to describe characteristics occurring in the particular segment. Optionally, to enforce consistency and to provide context of the video as a whole, the input vector may indicate at least some properties determined for the video as a whole. For example, the input vector may indicate the number of pauses in speech within the particular segment as well as the number of pauses in speech in the video as a whole (e.g., over all the segments).

The system can combine the outputs for the different segments of a video to obtain the overall classification. This can be done by averaging the feature vectors for the segments to result in an averaged feature vector that is used to select the final classification. As another example, the system can us a voting mechanism, where a classification is determined for each segment, and then the classification that occurs the most in the set is selected. Other algorithms or techniques for combining outputs can be used. For example, to achieve an "excellent" classification, the video may be required to have more than half of the segments classified as excellent, and to have none of the segments classified as "poor."

The system can perform training in multiple levels or stages with different sets or types of training data. For example, the models can be trained using the self-assessment feedback of the user that records the video. The models can also be trained using the combined feedback of multiple users. This can include selecting subsets of training data for specific contexts (e.g., specific companies or roles), and training in the aggregate based on those subsets. In addition, the models can be trained based on feedback from other users (e.g., peer users in the system). This can be especially useful when assigning raters known to have experience with the same or similar field, company, or role. Finally, training can be further refined using the actual outcomes of users, such as whether they passed or failed video interview screening for a certain company or with a certain third-party artificial intelligence or machine learning program. The system can progressively train the discriminator model in successive phases with more and more accurate training data. For example, training with self-assessment feedback can be done first, then training with ratings of other users is done next (providing a more objective reference than self-assessments), and then finally training further with classification labels set based on objective outcomes outside the practice interview platform (which provides concrete, objective references for the quality of videos).

FIG. 3B is an example diagram that illustrates the server system 120 using the trained discriminator model 122 to classify a video into one of multiple performance level classifications.

The user 102 can use the computing device 104 to record a video 330 ("Recorded Video B") for a practice interview. The computing device 104 can provide the video 330 to the server system 120 over the network 140.

The server system 120 can use a video manager 340 to manage incoming videos and provide performance results for the videos received. The video manager 340 can generate these performance results or performance metrics by combining (e.g., packaging) different types of performance indicators that include, for example, the performance level classification that a video is placed in, the video feature values extracted from the video, and target zones for the video feature values. These performance results or performance metrics are discussed in more detail below.

After receiving the video 330, the video manager 340 can provide the video 330 to the video processor 210 for processing. The video processor 210 can use the video 330 to generate the processed video 332. The video processors 210 can provide the processed video 332 to the feature module 310.

The feature module 310 can use the techniques described above with respect to FIG. 3A to extract a set of feature values 334 for the video 330. The set of feature values 334 can be represented as a feature vector. After extracting the set of feature values 334 from the processed video 332, the feature module 310 provides the feature values 334 as input to the trained discriminator model 122.

The trained discriminator model 122 can use the feature values 334 to generate a set of model outputs 336 for the video 330. The set of model outputs 336 can, for example, include an output value for each classification that the discriminator model 122 is trained to classify videos in. Each of the output values in the set of model outputs 336 can represent a probability that video 330 belongs to a particular classification or a confidence that the video 330 belongs to a particular classification. For example, the set of model outputs 336 can indicate that there is a 20% confidence that the video 330 belongs to the poor performance level classification, a 30% confidence that the video 330 belongs to the average performance level classification, and a 50% confidence that the video 330 belongs to the excellent performance level classification.

After generating the set of model outputs 336, the training and analysis module 220 can obtain the set of model outputs 336 from the trained discriminator model 122. The module 220 can determine a performance level classification 346 for the video 330 using the set of model outputs 336. For example, the module 220 can select the classification with the highest probability or confidence as indicated by the output values in the set of model outputs 336. In more detail, based on the value of 0.5 in the set of model outputs 336 being (i) larger than the other values of 0.3 and 0.2 and (ii) associated with the excellent performance level classification, the module 220 can classify the video 330 in the excellent performance level classification. Therefore, the performance level classification 346 can be the excellent performance level classification or an indication of the excellent performance level classification.

The training and analysis module 220 can also determine target zones 348 using past video classifications 356 and a set of past video features 358 (342). The target zones can represent targets for features values extracted from videos. Each target zone can correspond to a particular feature, e.g., a particular visual characteristic or audio characteristic of a video. The target zones can include, for example, particular target values, ranges of values, or series of values.

The target values, ranges, or series can be generated by the module 220 from feature values for videos that were previously classified in a particular performance level classification or a particular set of performance level classifications. For example, the module 220 may use only feature values for videos that were previously classified by the module 220 in the excellent performance level classification. In order to obtain this specific subset of feature values, the module 220 may access the data storage 130 to obtain past video classifications 356. The data storage 130 can store past videos 352 that include, for example, the recorded videos 132 and the newly-recorded videos 134, corresponding features values 354 previously extracted from the past videos 352, and the corresponding classifications 356 for the videos 352. The module 220 can use the past video classifications 356 to obtain identifiers for a subset of videos that were classified with the excellent performance classification. The module 220 can then use these identifiers to obtain video feature values 358 (e.g., include a set of video features or feature vector for each video classified in the excellent performance level classification) for the identified subset of videos. The video feature values 358 can represent a portion of the video feature values 354, such as those that correspond to a subset of the past videos 352 that have been classified in the highest classification (e.g., highest performance level classification).

In some implementations, the feature values 354 are extracted from metadata for the past videos 352. For example, each video in the past videos 352 can have metadata which includes a particular set of video features values from the video feature values 354.

In some implementations, the video classifications 356 are extracted from metadata for the past videos 352. For example, each video in the past videos 352 can have metadata which indicates a video classification (e.g., performance level classification) for the video and from the video classifications 356.

In some implementations, the training and analysis module 220 uses video feature values for videos across multiple video classifications to determine the target zones 348. For example, the module 220 can use a clustering model (e.g., k-means clustering model) to group the past videos 352 according to the video feature values 354. Clustering can be performed on a feature-by-feature basis such that, for example, clustering is performed multiple times using the past videos 352. For each of the features, the number of clusters can be set to two (e.g., which lends itself to efficiently analyzing the percentage of the highest and lowest video classifications represented in the two clusters) or to a number equivalent to the number of different video classifications. The module 220 can identify a representation of the different video classifications in the clustered groups to determine if a feature corresponding to the group is relevant to classification.

As an example, the clustering model can be a k-means cluster model where k=3 (e.g., to account for each of the poor performance level, the average performance level, and the excellent performance level) and is used by the module 220 to group the past videos 352 according to the pause feature to provide a first group of past videos that includes all videos that with 0-1 pauses, a second group of past videos that includes all videos with 2-4 pauses, and a third group of past videos with more that includes all videos with more than 5 pauses. The clustering model can be used by the module 220 again to group the past videos 352 according to a background objects feature to provide a first group of past videos that include all videos with 0-2 objects, a second group of past video that include all videos with 3-4 objects, and a third group of past videos that include all videos with more than 5 objects. For each of the different groups provided by the clustering model, the module 220 can identify a representation of videos in the group with the highest classification. The module 220 can apply a threshold percentage to the representation to determine if the video feature corresponding to the group is relevant to video classification. For example, the module 220 can use a threshold of 70% to determine that the pause feature is relevant to video classification based on 75% of the videos clustered in the first group of past videos for the pause feature being classified in the excellent performance classification. The module 220 can further use the threshold to determine that the background object feature is not relevant to video classification based on none of the three groups have a representation of videos classified in the excellent performance classification equal to or greater than the 70% threshold.

After determining which video features are relevant to video classification, the module 220 can limit determining target zones to those video features. The module 220 can determine the target zones using the techniques described above by, for example, obtaining past video feature values for only those past videos in the highest classification and for only those features determined to be relevant to video classification. After obtaining this subset of the video feature values 354, the module 220 can convert the subset of the feature values 354 to the target zones 348 using the techniques described below. Alternatively, the module 220 can use feature values from the clustered groups as the target zones 348 or to determine the target zones 348. Continuing the earlier example, based on the videos in the first clustered group of past videos for the pause feature having a representation of the excellent performance level of 75% and having feature values of 0 or 1, the module 220 can set the target zone for the pause feature to a series or series of [0, 1].

After obtaining the video feature values 358, the module 220 can use one or more processes to convert the video feature values 358 into the target zones 348. Different types of feature values may require the module 220 to use different processes to generate target zones and can result in different types of target zones, such as particular value, range, or series. As an example, the module 220 can determine a target by taking an average of the feature values for a particular feature, such as by calculating the mean, identifying a median, or identifying a mode. The system can determine a target range by identifying a minimum and maximum value among the feature values, or by applying a standard of deviation to a distribution of the feature values. The system can also or alternatively determine a target series or range by identifying a set of the most common feature values for a particular feature or by applying a standard of deviation to a probability distribution of the feature values. For example, the module 220 can identify that videos that were classified by the trained discriminator model 122 in the excellent performance level classification most commonly wore a blue or a white shirt and, therefore, generate a target series that includes only the values of blue and white for shirt color.

The training and analysis module 220 can provide the performance level classification 346 and the target zones 348 to the video manager 340. For example, after identifying the performance level classification 346 using the model outputs 336 and generating the target zones 348 based on the past video classifications 356 and the past video feature values 358, the module 220 can provide the performance level classification 346 and the target zones 348 to the video manager 340.

In some implementations, in determining the target zones (342), the training and analysis module 220 determines different target zones for different contexts. For example, the module 220 can receive an indication of a particular context for the recorded video 330 that indicates a particular company, role, or position that the practice interview of the user 102 was recorded for. Using this context, the module 220 can access metadata for the past videos 352 to identify those that have the same context as the recorded video 330. The module 220 can use the identified subset of the recorded videos 352 to obtain a corresponding subset of the video classifications 356. The module 220 can proceed as described above by using the subset of the video classifications 356 to identify groups or clusters of videos for the particular context that correspond to different performance level classifications or scores as indicated by the trained machine learning model. Based on the characteristics of the sets of feature values in the groups, the module 220 can determine the values, ranges, and combinations of feature values that are most common among the high-performance group of videos, as well the values, ranges, and combinations of feature values that are most common among the low-performance group. From the feature values in the different clusters (e.g., average values, distributions, etc.), the module 220 can set target zones representing the sets or ranges of feature values for different audio and video characteristics that, based on the outputs of the trained discriminator model, are most likely to lead to classification in the highest-quality classification.

For example, the system may determine that, among videos recorded for a particular employer and scored based on a model trained for that employer, a particular set of videos had a score of above 0.7 for the highest-quality classification. The system can then examine the range of feature values for each of a speaking speed feature, a speech intonation feature, a visual background feature, and so on. The system can set, as a target zone for each feature, the range where at least a majority of the videos fall (and potentially more, such as a range encompassing 80%, 90%, etc. of the feature values for a characteristic). The system can then use the target zones for indicating feedback to the user, e.g., indicating that the user had 4 pauses in speech, while the target zone (determined based on videos the trained model scored highly) is between zero and two pauses per video.

As discussed above, the video manager 340 can be used to generate a set of one or more performance metrics for incoming videos. The video manager 340 can combine different performance metrics to generate or compile the performance metrics 350 for the video 330. For example, the video manager 340 can generate or compile the performance metrics 350 by packaging the performance level classification 346 for the video 330, the feature values 334 or a subset of feature values 334 for the video 330, and the target zones 348 or a subset of the target zones 348.

In generating or compiling the performance metrics 350, the video manager 340 can perform one or more additional processes. For example, the video manager 340 can select a subset of the feature values 334 and/or a corresponding subset of the target zones 348 to include in the performance metrics. In more detail, the video manager 340 may select those feature values of the feature values 334 that did not meet their corresponding target zone of the target zones 348. For example, if the feature values 334 include a feature value of 3 for the number of objects detected in the background and the corresponding target zone is a range of values from 0-2, then the video manager 340 may select the feature value of 3 for the number of objects to include in the performance metrics 350. The video manager 340 may also select the corresponding target zone range of values of 0-2 to, for example, present to the user 102 alongside their feature value or score for the number of objects detected in the background. In this way, the video manager 340 can help the user 102 identify specific areas where characteristics of their practice interview video differ from those of videos that were classified in the "excellent" performance level classification. Additionally or alternatively, the video manager 340 may select those feature values of the feature values 334 that had the most significant effect on the video 330 being categorized in the average performance level classification or not being categorized in the excellent performance level classification. The video manager 340 can determine which feature values in the features values 334 had the most significant effect by, for example, running simulations on the discriminator model with modifications to the features values 334 (e.g., where a single value is changed at a time for each simulation, or a small set of values are changed at a time for each simulation, etc.). In some implementations, these example processes are performed by the training and an analysis module 220 instead of the video manager 340.

As another example, the video manager 340 can generate performance metrics to include in the performance metrics 350 by performing calculations using the feature values 334 and the target zones 348. For example, the video manager 340 can determine a change in value needed for a particular feature to reach the corresponding target zone for that feature. In more detail, in determining a change in value the video manager 340 can determine differences or distances between one or more feature values in the feature values 334 and one or more corresponding target zones in the target zones 348. For example, if the features values 334 include a feature value of 3 for the number of objects detected in the background of the video 330 and the corresponding target zone is a range of values from 0-2, then the video manager 340 may determine a difference of 1 between the feature value and the corresponding target zone as indication for the user 102 that the feature value for this background number of objects feature needs to change by 1 to reach the target zone for the background number of objects feature. The video manager can include this difference in the performance metrics 350. In some implementations, these example processes are performed by the training and an analysis module 220 instead of the video manager 340.

The video manager 340 can also determine a direction of change that is needed for a particular feature to reach the corresponding target zone for that feature. Referring to the previous example, the video manager 340 can determine that the number of objects in the background needs to be decreased in order to reach the target zone range of 0-2. The video manager can include this direction in the performance metrics 350. The direction required for a feature value can be presented alongside the feature value and/or the magnitude of change needed to reach the corresponding target zone. In some implementations, these example processes are performed by the training and an analysis module 220 instead of the video manager 340.

As another example, the video manager 340 can use the feature values 334 and the past video feature values 358 or the target zones 348 to normalize at least a subset of the feature values 334. For example, with respect to FIG. 1, the video manager 340 can normalize the feature value of 3 for the number of voices in the video data 110 to a score between 1-10 based on how frequent that number of voices appears in videos classified in the excellent performance classification. Here the score of "1" can indicate that no videos or a very low percentage (e.g., less than 5%) of videos classified in the excellent performance classification include three or more distinct voices. In some implementations, these example processes are performed by the training and an analysis module 220 instead of the video manager 340.

In some implementations, the performance metrics for a video only include a performance level classification for the video. For example, the performance metrics 350 can only include an indication that the video 330 was classified in the average performance classification.

The video manager 340 can provide the performance metrics 350 to the computing device 104 over the network 140. After receiving the performance metrics, the computing device 104 can present the performance metrics to the user 102 through, for example, a display of the device 104. For example, the computing device 104 can present a video analysis interface 370 to the user 102 that includes a classification 372 indicating that the video was classified in the excellent performance level classification. The interface 370 can also present an area 374 containing a set of features, corresponding feature values extracted from the video, and corresponding target zones for the feature values. For example, a portion of the area 374 can be provide information for and related to the eye contact percentage feature. This portion can include an extracted feature value of 90, indicating that the user 102 maintained 90% eye contact over the course of the practice interview. This portion can also include a target zone that is a range of values between 88 and 100, indicating that the feature score for the eye contact percentage feature is within the target zone.

FIGS. 4A-4D are example interfaces 410, 420, 430, and 440 that can be presented at different stages of a practice video interview. For example, the example interface 410, 420, 430, and 440 can be presented on the display of the computing device 104 for the user 102 as shown in FIG. 1.

Figure 4A:
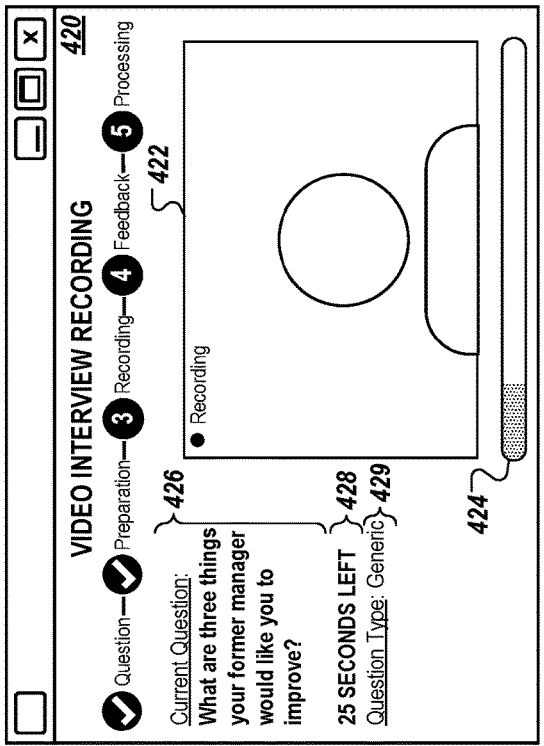
FIGS. 4A-4D are example user interfaces that can be presented at different stages for configuration, video capture, presentation of analysis results, and simulation of changes to video characteristics.

FIG. 4A include a search bar 412 or a menu that the user can interact with to find search for particular companies, particular roles, or particular fields and access practice interviews that a particular to those companies, roles, or fields. The interface 410 can include a set of interface elements 414a, 414b, and 414c for specific types of practice interview that the user previously recorded videos for or searched. These specific types of practice interviews can be catered to particular companies, particular roles, particular fields, or combinations of the three. For example, each of the interface elements 414a, 414b and 414c can be interface elements for three different companies and roles at the companies. These different companies or roles can represent different contexts for recording videos. When recording a new video, the user can select one of these elements 414a, 414b, and 414c to specify the type of interview the user is practicing for. The system can use this indication to select and provide an appropriate prompt and interface for recording a new video. The prompts used can vary from one employer or role to the next, to better replicate the experience of interviewing for that employer or role. In addition, the system can tag the resulting recorded video as corresponding to the appropriate context, to be able to use that information in tailoring models for high accuracy in specific contexts.

By interacting with the "Record New Clip" interface element in any of the interface elements 414a, 414b, and 414c, the user can initiate a new practice interview of a type specific to the one of the interface elements 414a, 414b, and 414c. Different types of practice interviews may have different formats. For example, the practice interview for the Graphic Designer role at Company 1 has a format where the user will be given 30 seconds of preparation time per prompt and one minute of response time per prompt. In contrast, the practice interview for the Software Developer role at Company 2 has a format where the user will be given 1 minute of preparation time per prompt and 90 seconds of response time per prompt. Other formats differences between different types of practice interviews can include a length of time of the practice interview and a number of prompts during the practice interview. The different types of practice interviews can also include content differences. For example, the set of prompts used for practice interviews for the Graphic Designer role at Company 1 can different from a set of prompts used for practice interviews for the Barista role at Company 3.

A user can also user the interface 410 to view previously recorded videos. As indicated in the company interface element 414b and the company interface element 414c, the user has previously recorded videos of practice interview for each of the respective companies (e.g., Company 2 and Company 3) or each of the respective roles (e.g., Software Developer and Barista). The user can select a "View Last Clip" interface element in the company interface element 414b to view the last video they recorded for a Company 2 practice interview or for a software developer role. The user can also select another "View Last Clip" interface element in the company interface element 414c to view the most recent video they recorded for a Company 3 practice interview or for a barista role.

After selecting one of the "Record New Clip" interface elements in the interface 410, the server system 120 can present the user a prompt interface that presents the user with a first prompt of the practice interview. The prompt interface can also include a timer indicating how much response preparation time is remaining until recording starts.

Figure 4B:
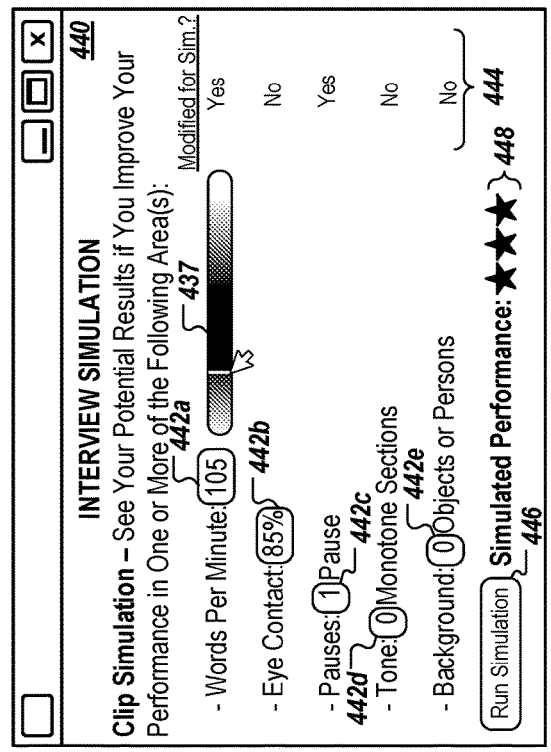

FIG. 4B shows the example interface 420 that is presented to a user after they have started a practice interview. The interface 420 can be video interview recording interface that includes a live-video-feed element 422 showing the user a live video feed of the practice interview in progress. The interface 420 can present a prompt 426 that the user is expected to provide a response to within a time frame. The interface 420 can include a timer element 424 that visually depicts that amount of response time the user has used for the prompt 426 and the amount of time remaining. The interface 420 can alternatively or additionally include a timer 428 that numerically indicates the amount of response time left for the prompt 426.

The interface 420 can also present the user with other information that they might find useful or that might assist them during the practice interview. For example, the interface 420 can include a category 429 for the prompt 426 that can let the user know that this is common question they might see on other interviews or are more likely to see during an actual interview, that can help the user reduce the preparation time needed to form the response, or otherwise help the user formulate the response.

The interface 420 can be presented after the prompt interface described above. For example, in response to the preparation time for the prompt 426 running out, the server system 120 can provide the interface 420 and start recording using the camera 106 of the computing device 104.

Figure 4C:
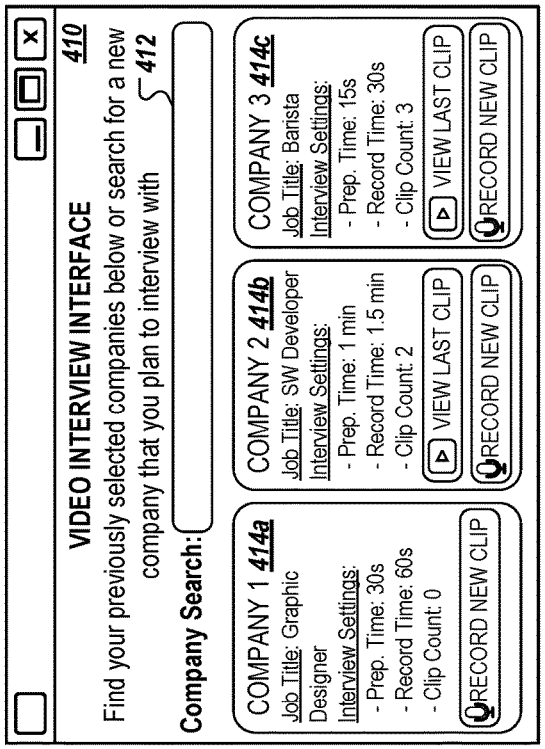

FIG. 4C shows the example interface 430 that is presented to a user after they have completed a practice interview. The interface 430 can be generated using the performance results for the video recorded by the user and analyzed by the server system 120 using the discriminator model 122. The performance results can be the output of the training and analysis module 220 and include for example a classification 432 for the video, feature values included in interface elements 436, and indication of how the feature values compare to corresponding target zones. As an example, the classification 432 can indicate the user's video was classified by the server system 120 using the discriminator model 122 into the average performance level classification.

As an example, the interface elements 436 can include a first interface element for words per minute (WPM) of the user's speech in the recorded video and the most frequent word used by the user in the video. This interface element can include a bar 437 that indicates the user's WPM compared to a target zone for WPM. The target zone can be represented by the black section in the bar 437 indicating that the user's WPM was below the target WPM zone. The bar also indicates that if a user's WPM gets too high, it goes beyond the target WPM zone.

The interface 430 can also include an interface element 433 that displays visual data from the video and an interface element 434 for the corresponding audio data from the video. The user can use a mouse cursor, their keyboard, touch inputs, or another input device to scrub a position marker through the interface element 434. As the user moves the position marker through the interface element 434 to a particular location in the audio data, the interface element 433 can dynamically update to present the user the visual data that was captured at the same time as when that audio data at the particular location was captured. By providing this feature, the user can easily recall events during the practice interview and their responses that may have led to positive feature values or negative features values as indicated by the interface elements 435.

The interface elements 435 can be overlays on interface element 434 or generated as part of the interface element 434. The interface elements 435 can highlight periods of time that correspond to particular audio feature events (e.g., particular audio feature values or audio feature value thresholds). For example, the lightly shaded elements in the interface elements 435 can indicate periods of features values that matched corresponding target zones, such as periods of time when the speech of the user had dynamic frequency variation (e.g., not monotone), was in a good range of volume levels, did not include pauses, included speech with sufficient WPM, etc. In contrast, the darker shaded elements in the interface elements 435 can indicate periods of features values that did not match corresponding target zones, such as periods when more than threshold level of volume was detected, periods when the user paused more than two seconds, periods when the user used filler keywords in his or her speech, etc.

As discussed above with respect to FIG. 1 and FIG. 3B, the video analysis results interface 430 can also include suggestions that provided recommended changes to particular features of the user's video.

In addition, the feedback to the user may include a comparison of the user's overall video classification or specific audio or video characteristics with those of other users. For example, the interface can show where the user falls with respect to other users, such as a ranking or classification (e.g., "this video ranks higher than 52% of other videos for this company" or "this video is in the second-to-highest performance tier among other users practicing interviews for this company"). The feedback can also indicate changes to video characteristics (e.g., in visual, verbal, vocal dimensions or for specific characteristics) that would alter the position in the rankings, alter the expected outcome of the video (e.g., passing or failing screening), or alter the likelihood of a desired outcome (e.g., passing screening).

Figure 4D:
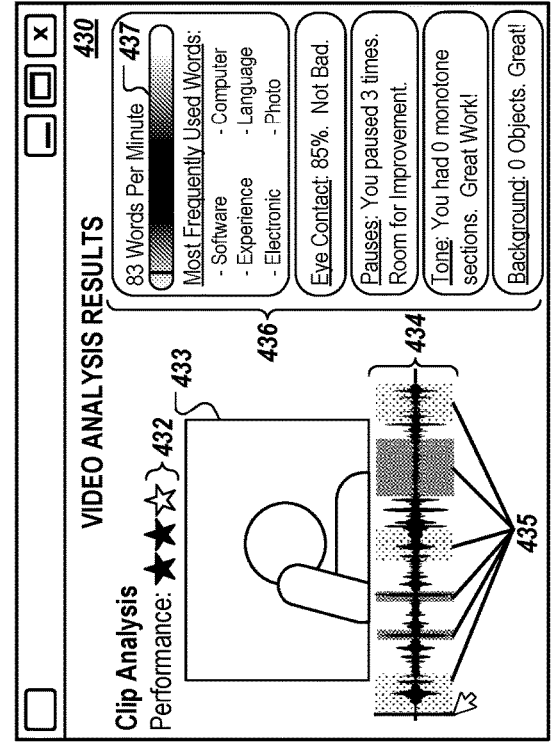

FIG. 4D the example interface 440 that can optionally be presented to a user to perform simulations using modified feature values for a video. For example, the interface 440 can be an interview simulation interface that allows the user to make one or more changes to feature values from their last video or from another video that they select (e.g., a video from a previous day, selected from a library or history of videos created by the user). The simulation interface 440 can also allow the user to create a set of feature values from scratch if they wish to.

Once the interface 440 is presented to the user, the server system 120 can automatically populate the interface with the feature values from the user's last video (or other video the user selects). For example, a first value field 442a for the WPM feature can be loaded with the value 83, a second value field 442b for the eye contact percentage feature can be loaded with the value 85, a third value field 442c for the pause feature can be loaded with the value 1, a fourth value field 442d for the monotone sections feature can be loaded with the value 0, and a fifth value field 442e for the number of object or persons in the video background can be loaded with the value 0. The user can update the value fields 442a, 442b, 442c, 442d, and 442e as they see fit and run a simulation with the modified values. The interface 440 can include an interface 444 that tracks whether the user has changed a value in a field from its extracted feature value in the last video and dynamically updates in response to user changes to the fields.

After the user modifies the feature values to their liking, the user can interact with a simulation interface element 446 to initiate a simulation using the modified feature values. As an example, the server system 120 can create a new feature vector that includes the modified feature values (as well as any feature values for the prior video that were not changed) and provides the feature vector as input to the discriminator model 122. The output of the discriminator model 122 can be used to determine a simulated classification 448 given the modified feature values that is presented on the interface 440. As shown, using the simulation interface 440, the user can determine that if they increase the WPM feature value from 83 WPM to 105 WPM and reduce the number of pauses from 3 to 1, the video would be classified in the excellent performance level classification instead of the average performance level classification. As a result, the user can try out different combinations of audio and video characteristics and see a simulation result representing the classification or other properties (e.g., scores, likelihoods, etc.) that the system predicts would result from the combination of values chosen.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A computer-implemented method comprising:
   training a machine learning model to classify videos into performance level classifications based on characteristics of image data and audio data in the videos, wherein the model is trained based on training data that includes (i) videos recorded in response to prompts to users, wherein the videos that include speech of the users and image data of the users, and (ii) classification labels assigned to the videos;
   receiving, over a communication network, video data captured by a device of a user following a prompt that the device provides to the user, wherein the video data depicts a face of the user and includes speech of the user that responds to the prompt provided by the device;
   storing multiple trained machine learning models, each of the trained machine learning models being trained to classify videos for a different context;
   identifying a context for the video data;
   selecting, from among the multiple trained machine learning models, a trained machine learning model for the identified context;
   determining, based on the video data, a set of feature values that describe audio and video characteristics of the video data;
   providing the set of feature values as input to the selected machine learning model to generate output that classifies the video data with respect to the performance level classifications based on the set of features provided to the selected machine learning model; and
   updating a user interface of the device based on the performance level classification for the video data, including transmitting, to the device over the communication network, user interface data that indicates the performance level classification and one or more characteristics of the video data that contributed to the classification of the video data.

2. The method of claim 1, wherein:
   the machine learning model is a neural network; and
   training the machine learning model comprises updating values of weights for nodes of the neural network to improve classification accuracy of the machine learning model.

3. The method of claim 2, wherein the output of the trained machine learning model comprises a value, for each of the performance level classifications, indicating a likelihood that the corresponding performance level classification is applicable to the input set of feature values.

4. The method of claim 2, wherein the output of the trained machine learning model comprises scores for each of multiple performance level classifications, the scores providing a probability distribution over the multiple performance level classifications; and
    wherein the method includes:
        identifying, from among the scores, a score indicating the highest probability; and
        classifying the received video data with the performance level classification that corresponds to the identified score indicating the highest probability.

5. The method of claim 2, wherein the neural network is a convolutional neural network or a deep learning neural network.

6. The method of claim 1, wherein the performance level classifications represent different levels of quality of video data.

7. The method of claim 6, wherein the performance level classifications include at least three classifications that represent different levels of video quality.

8. The method of claim 1, further comprising:
    obtaining practice interview videos respectively recorded by different users; and
    obtaining information indicating outcomes that are based at least in part on analysis of video interview recordings by one or more third-party video analysis systems;
    wherein the classification labels assigned to the videos are based on the outcomes.

9. The method of claim 1, wherein the performance level classifications represent different ranges of likelihoods of success in an interview for a particular company or for a particular role.

10. The method of claim 1, wherein the performance level classifications are a predetermined set of classifications, the method comprising:
    using the output to identify a classification from the predetermined set of classifications.

11. The method of claim 1, the method comprising:
    wherein identifying the context comprises identifying, based on information from the device, a particular company that the user is interested in interviewing with or a particular role that the user interested in interviewing for; and
    wherein selecting the trained machine learning model comprises selecting the trained machine learning model, based on the particular company or particular role, from among multiple machine learning models each trained based on example video data associated with a different company or role.

12. The method of claim 11, wherein selecting the machine learning model from the multiple machine learning models comprises selecting a machine learning model that is trained using video data that:
    includes responses to prompts selected for the particular company or the particular role;
    meets criteria for the particular company or the particular role; or
    is evaluated using criteria for the particular company or the particular role.

13. The method of claim 1, wherein the method is performed by a computer system providing a platform for recording and analysis of video data, wherein training the machine learning model comprises training the machine learning model in multiple phases using different types of training data, including using multiple sources of training data from among a set consisting of:
    scores or classifications provided for the videos by the users depicted in the videos;
    scores or classifications provided by users different from the users depicted in the videos;
    groups of videos recorded by different users;
    progressions of scores or classifications for videos individual users across multiple videos; and
    outcomes that result from other videos that are not available to and are not recorded using the platform provided by the computer system, the outcomes being for users for which at least one video is available to or recorded using the platform.

14. The method of claim 1, wherein the video data is recorded through a platform provided by one or more computers, and wherein updating the user interface comprises providing, for display in the user interface, data that indicates a ranking or classification of the video data relative to videos of a set of other users that have recorded videos using the platform.

15. The method of claim 1, further comprising segmenting the video data into multiple segments each having no more than a predetermined maximum length;
    wherein determining the set of feature values comprises determining a set of feature values for each of the multiple segments of the video data, the set of feature values for each segment indicating audio and video characteristics of the video data in the segment;
    wherein providing the set of feature values comprises providing, as input to the trained machine learning model, the set of feature values for each of the multiple segments to obtain separate output of the trained machine learning model for each of the multiple segments;
    wherein the method comprises combining the separate outputs of the trained machine learning model for the multiple segments such that the performance level classification for the video data is a composite of information from the separate outputs for the multiple segments.

16. The method of claim 1, wherein training the machine learning model comprises training the machine learning model to provide output that approximates classification results made using output of a third-party machine learning system; and
    wherein updating the user interface comprises providing feedback to indicate changes to characteristics of the video data, wherein the changes are predicted by the one or more computers to increase a likelihood that a predetermined outcome would be achieved in response to providing based on the third-party machine learning system.

17. The method of claim 1, further comprising providing user interface data for a simulation user interface having interactive user interface controls that enable a user to specify different values for audio and video characteristics, wherein the simulation user interface is configured to present a simulation result indicating a performance level classification determined based on the values specified using the user interface controls.

18. A system comprising:
    one or more computers; and
    one or more computer-readable media storing instructions that are operable, when executed by the one or more computers, to cause the one or more computers to perform operations comprising:
        training a machine learning model to classify videos into performance level classifications based on characteristics of image data and audio data in the videos, wherein the model is trained based on training data that includes (i) videos recorded in response to prompts to users, wherein the videos that include speech of the users and image data of the users, and (ii) classification labels assigned to the videos;

receiving, over a communication network, video data captured by a device of a user following a prompt that the device provides to the user, wherein the video data depicts a face of the user and includes speech of the user that responds to the prompt provided by the device;

storing multiple trained machine learning models, each of the trained machine learning models being trained to classify videos for a different context;

identifying a context for the video data;

selecting, from among the multiple trained machine learning models, a trained machine learning model for the identified context;

determining, based on the video data, a set of feature values that describe audio and video characteristics of the video data;

providing the set of feature values as input to the selected machine learning model to generate output that classifies the video data with respect to the performance level classifications based on the set of features provided to the selected machine learning model; and updating a user interface of the device based on the performance level classification for the video data, including transmitting, to the device over the communication network, user interface data that indicates the performance level classification and one or more characteristics of the video data that contributed to the classification of the video data.

19. One or more non-transitory computer-readable media storing instructions that are operable, when executed by the one or more computers, to cause the one or more computers to perform operations comprising:

training a machine learning model to classify videos into performance level classifications based on characteristics of image data and audio data in the videos, wherein the model is trained based on training data that includes (i) videos recorded in response to prompts to users, wherein the videos that include speech of the users and image data of the users, and (ii) classification labels assigned to the videos;

receiving, over a communication network, video data captured by a device of a user following a prompt that the device provides to the user, wherein the video data depicts a face of the user and includes speech of the user that responds to the prompt provided by the device;

storing multiple trained machine learning models, each of the trained machine learning models being trained to classify videos for a different context;

identifying a context for the video data;

selecting, from among the multiple trained machine learning models, a trained machine learning model for the identified context;

determining, based on the video data, a set of feature values that describe audio and video characteristics of the video data;

providing the set of feature values as input to the selected machine learning model to generate output that classifies the video data with respect to the performance level classifications based on the set of features provided to the selected machine learning model; and updating a user interface of the device based on the performance level classification for the video data, including transmitting, to the device over the communication network, user interface data that indicates the performance level classification and one or more characteristics of the video data that contributed to the classification of the video data.

20. The one or more non-transitory computer-readable media of claim 19, wherein identifying the context comprises identifying, based on information from the device, a particular company that the user is interested in interviewing with or a particular role that the user interested in interviewing for; and wherein selecting the trained machine learning model comprises selecting the trained machine learning model, based on the particular company or particular role, from among multiple machine learning models each trained based on example video data associated with a different company or role.

* * * * *